(12) United States Patent
Subasingha et al.

(10) Patent No.: US 11,994,591 B2
(45) Date of Patent: May 28, 2024

(54) DETERMINING DEPTH USING MULTIPLE MODULATION FREQUENCIES

(71) Applicant: Zoox, Inc., Foster City, CA (US)

(72) Inventors: Subasingha Shaminda Subasingha, San Ramon, CA (US); Yongzhe Chen, San Jose, CA (US); Mehran Ferdowsi, San Mateo, CA (US); Samuel Holladay, San Francisco, CA (US); Turhan Karadeniz, Oakland, CA (US); Robert Nicholas Moor, San Mateo, CA (US); Joseph Patrick Warga, San Francisco, CA (US); Harrison Thomas Waschura, Los Altos Hills, CA (US); Silas Kogure Wilkinson, San Francisco, CA (US)

(73) Assignee: Zoox, Inc., Foster City, CA (US)

(*) Notice: Subject to any disclaimer, the term of this patent is extended or adjusted under 35 U.S.C. 154(b) by 416 days.

(21) Appl. No.: 17/115,180

(22) Filed: Dec. 8, 2020

(65) Prior Publication Data
US 2022/0179089 A1    Jun. 9, 2022

(51) Int. Cl.
*G01S 17/931*      (2020.01)
*B60W 60/00*      (2020.01)
(Continued)

(52) U.S. Cl.
CPC .......... *G01S 17/931* (2020.01); *G01S 13/931* (2013.01); *G01S 15/931* (2013.01); *G06T 7/521* (2017.01);
(Continued)

(58) Field of Classification Search
CPC ......... G01S 17/931; G06T 7/521; G06T 7/55; G06T 7/70; G06T 2207/10028;
(Continued)

(56) References Cited

U.S. PATENT DOCUMENTS

| 7,741,961 B1 | 6/2010 | Rafii et al. |
| 8,429,972 B2 | 4/2013 | Karasawa |

(Continued)

FOREIGN PATENT DOCUMENTS

WO    WO2018103467 A1    6/2018

OTHER PUBLICATIONS

International Search Report and Written Opinion for PCT Application No. PCT/US21/62325, dated Mar. 24, 2022, 8 pages.
(Continued)

*Primary Examiner* — Ig T An
(74) *Attorney, Agent, or Firm* — Lee & Hayes, P.C.

(57) ABSTRACT

Sensors, including time-of-flight sensors, may be used to detect objects in an environment. In an example, a vehicle may include a time-of-flight sensor that images objects around the vehicle, e.g., so the vehicle can navigate relative to the objects. The sensor may generate first image data at a first configuration and second image data at a second configuration. An estimated depth of an object may be determined from the first image data, and an actual depth of the object may be determined from the second image data, based on the estimated depth. In examples, the first and second configurations have different modulation frequencies such that a nominal maximum depth in the first configuration is greater than the nominal maximum depth in the second configuration.

20 Claims, 9 Drawing Sheets

(51) Int. Cl.
*G01S 13/931* (2020.01)
*G01S 15/931* (2020.01)
*G06T 7/521* (2017.01)
*G06T 7/55* (2017.01)
*G06T 7/70* (2017.01)

(52) U.S. Cl.
CPC .............. *G06T 7/55* (2017.01); *G06T 7/70* (2017.01); *B60W 60/001* (2020.02); *B60W 2554/402* (2020.02); *B60W 2554/4041* (2020.02); *G06T 2207/10028* (2013.01); *G06T 2207/30241* (2013.01); *G06T 2207/30252* (2013.01)

(58) Field of Classification Search
CPC ........... G06T 2207/30241; G06T 2207/30252; B60W 60/001; B60W 2554/4041
See application file for complete search history.

(56) References Cited

U.S. PATENT DOCUMENTS

| | | | |
|---|---|---|---|
| 10,237,532 B2 | 3/2019 | Monnier et al. | |
| 10,359,855 B1 | 7/2019 | Vonikakis | |
| 10,382,736 B1* | 8/2019 | Thurner | H04N 13/296 |
| 10,557,921 B2 | 2/2020 | Bleyer et al. | |
| 10,875,889 B2 | 12/2020 | Jakel | |
| 11,069,082 B1* | 7/2021 | Ebrahimi Afrouzi | H04N 23/56 |
| 11,244,464 B2 | 2/2022 | Srinivasan et al. | |
| 11,380,046 B2 | 7/2022 | Dabral et al. | |
| 11,481,913 B2 | 10/2022 | Deegan et al. | |
| 11,501,452 B2 | 11/2022 | Jayaraman et al. | |
| 11,567,497 B1 | 1/2023 | Foster | |
| 2003/0169906 A1 | 9/2003 | Gokturk et al. | |
| 2014/0152975 A1 | 6/2014 | Ko | |
| 2016/0124089 A1* | 5/2016 | Meinherz | G01S 17/36 356/5.01 |
| 2016/0314613 A1 | 10/2016 | Nowozin et al. | |
| 2017/0234985 A1* | 8/2017 | Kadambi | G01S 17/894 702/152 |
| 2020/0090355 A1* | 3/2020 | Hall | G01S 17/32 |
| 2020/0158876 A1 | 5/2020 | Karadeniz et al. | |
| 2020/0225673 A1* | 7/2020 | Ebrahimi Afrouzi | G05D 1/0044 |
| 2022/0066004 A1* | 3/2022 | Ott | G01S 17/58 |
| 2022/0099836 A1 | 3/2022 | Croxford et al. | |
| 2022/0180538 A1 | 6/2022 | Subasingha et al. | |
| 2022/0180539 A1 | 6/2022 | Subasingha et al. | |

OTHER PUBLICATIONS

Office Action for U.S. Appl. No. 17/115,254, dated Feb. 2, 2023, Subasingha, "Determining Pixels Beyond Nominal Maximum Sensor Depth", 9 pages.

Office Action for U.S. Appl. No. 17/115,320, dated Mar. 16, 2023, Subasingha, "Depth Dependent Pixel Filtering", 8 pages.

* cited by examiner

DETERMINING DEPTH USING MULTIPLE MODULATION FREQUENCIES

BACKGROUND

Time-of-flight sensors may be unreliable in certain environments, including environments with varied lighting and/or environments with objects having different reflectivity. Moreover, because time-of-flight sensors are often designed to detect objects in predetermined distance ranges, environments that include multiple objects at different distances may be difficult to interpret, e.g., due to ambiguity in the sensor returns. Such shortcomings may result in unreliable data, increased processing time to better understand the data, and/or decreased efficiency in identifying and/or characterizing objects that may be potential obstacles to safe travel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
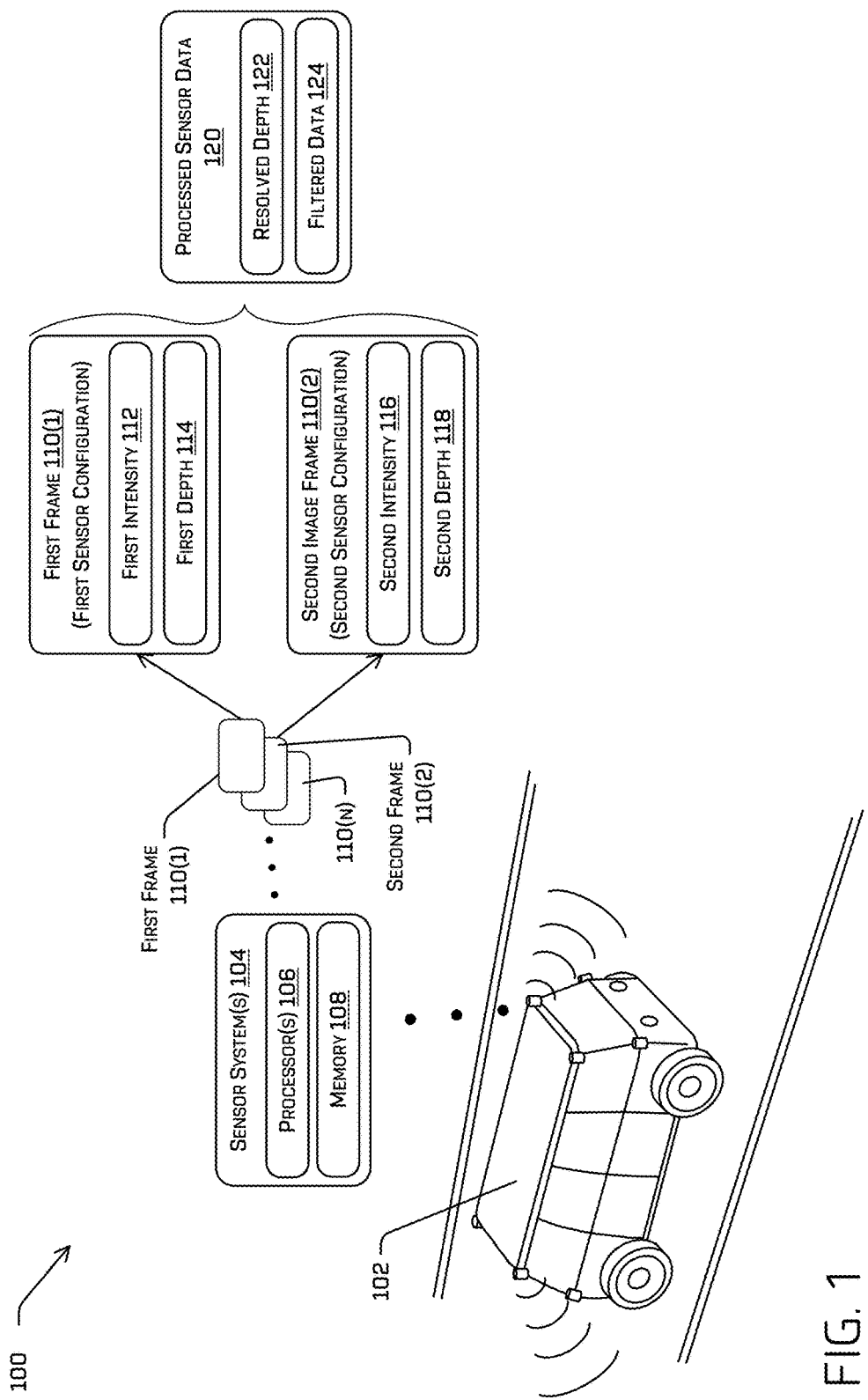
FIG. 1 illustrates an example vehicle, such as an autonomous vehicle, and example components and processes for generating improved sensor data associated with an environment of the vehicle, as described herein.

This disclosure describes methods, apparatuses, and systems for using sensor data to identify objects in an environment and for controlling a vehicle relative to those identified objects. For example, an autonomous vehicle can include a plurality of sensors to capture sensor data corresponding to an environment of a vehicle. The sensor data can include data associated with an environment where, in some instances, multiple objects (e.g., pedestrians, vehicles, bicyclists, etc.) are located. Oftentimes, different sensor modalities are used for redundancy purposes and/or because of inherent shortcomings in the sensors. For example, in the case of time-of-flight sensors, intensity and distance information may be unreliable due to one or more of oversaturation, under exposure, ambiguous returns, or the like. Moreover, some data resolution techniques, such as techniques used to resolve a depth of an object from multiple returns associated with an object can sometimes result in inaccurate depths Techniques described herein can be used to improve sensor data, including time-of-flight sensor returns. For example, in implementations described herein, returns for a time-of-flight sensor may be obtained at different modulation frequencies to provide new techniques for resolving distance of objects based on those returns. Moreover, techniques described herein may be used to more accurately determine whether distances associated with those returns are within a nominal maximum range of the time-of-flight sensor. Techniques disclosed herein can also provide for improved filtering of pixels based on depth of those pixels, including depths determined according to the techniques described herein. The techniques described herein may, in some instances, result in a better understanding of the environment of the vehicle, thereby leading to safer and/or more confident controlling of the vehicle.

As discussed herein, sensor data can be captured by one or more sensors, which can include time-of-flight sensors, RADAR sensors, LIDAR sensors, SONAR sensors, image sensors, microphones, or any combination thereof. The sensor can include an emitter to emit a signal and a sensor to sense a return signal from the environment. Further, the sensor can comprise a sensor computing device to determine a data format of the captured sensor data.

In the context of a time-of-flight (ToF) sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can be associated with the pixels (e.g., an intensity and depth value for each pixel) in the sensor data. The sensor computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

In implementations described herein, the sensor and/or the sensor computing device may vary attributes of the sensor and/or processes using the sensor to generate improved sensor data. For example, in some implementations, the carrier may be modified to establish different configurations of the sensor. For example, in implementations described herein, the modulation frequency of the emitted carrier signal may be varied between successive frames. The modulation frequency may be varied between a first, relatively lower modulation frequency and a second, relatively higher modulation frequency. In examples, the lower modulation frequency will configure the sensor with a larger nominal maximum range, but in some instances at a lower accuracy, and the higher modulation frequency will configure the sensor with a shorter nominal maximum range, with usually with higher accuracy.

In some examples, the relatively lower modulation frequency is selected to provide a considerably larger nominal maximum depth than the nominal maximum depth associated with the relatively higher modulation frequency. In some examples, the higher modulation frequency may be on the order of three- to eight-times higher than the lower modulation frequency. For instance, the lower modulation frequency may be between about 3 MHz and about 5 MHz, which may provide a nominal maximum depth on the order of about 35 meters or more. The higher modulation frequency may be about 20 MHz or greater, which may provide a nominal maximum depth of 4 to 5 meters or less.

In examples, returns associated with the different modulation frequencies can be considered together to determine a more accurate depth measurement for detected surfaces. In some examples, returns associated with the lower modulation frequency may be used, e.g., independent of the returns associated with the higher modulation frequency, to determine an estimated depth. For example, because the nominal maximum depth associated with the lower modulation frequency is relatively large, e.g., 35 meters or more, most detected surfaces will be within the nominal maximum range. Accordingly, the nominal depth measured by the first modulation frequency is likely the depth of the surface, and in implementations can be used as an estimated depth. In an example, a nominal measurement of 9.7 meters measured at the first, e.g., lower, modulation frequency is likely to be from a surface 9.7 meters from the time-of-flight sensor.

Unlike the measurement at the lower modulation frequency, the depth measured at the higher modulation frequency may be more likely to be ambiguous, e.g., corresponding to the nominal depth or to a sum of the nominal depth and a multiple of the nominal maximum range (or maximum unambiguous range). For instance, consider a return having a nominal measurement of 1.5 meters generated with the sensor operating at the higher modulation frequency and having a nominal maximum range of 4 meters. The 1.5 meter nominal measurement may correspond to a number of candidate depths, including a depth of 1.5 meters (the nominal depth), a depth of 5.5 meters (the nominal measurement plus the nominal maximum range—4 meters), 9.5 meters (the nominal measure plus two times the nominal maximum range—8 meters), and so forth. In examples of this disclosure, because the depth has already been estimated from the lower modulation frequency return(s), the actual depth of the surface may be the candidate depth of the higher modulation frequency closest to this estimated depth. For instance, consider the example above in which estimated depth (from the lower modulation frequency return(s)) is 9.7 meters, the techniques described herein will determine the actual depth to be 9.5 meters, e.g., the candidate depth closest to 9.7 meters. The return associated with the higher modulation frequency may be more reliable than the return associated with the (significantly) lower modulation frequency, so the techniques described herein may provide improved accuracy over conventional techniques.

Some example implementations of this disclosure may also incorporate disambiguation techniques. For instance, in some implementations, disambiguation techniques may be used to determine whether a return is actually within the nominal maximum depth of the sensor in the first configuration, e.g., at the lower modulation frequency. As noted above, in some instances it may be desirable to select a lower modulation frequency that provides a relatively large nominal maximum depth, such that most objects beyond the nominal maximum depth at the lower modulation frequency will not be detected. However, in some instances, some objects beyond the nominal maximum depth may be detected. For instance, highly reflective objects, such as retroreflectors, may still be detectable beyond the nominal maximum sensor depth. In examples, techniques described herein may determine when detected objects are such highly reflective objects.

In some example implementations, disambiguation techniques may be used to determine that a measured surface is beyond the nominal maximum range of the sensor in the first, e.g., lower modulation frequency, configuration. For instance, techniques described herein may determine first candidate depths for returns at the lower modulation frequency and second candidate depths for returns at the higher modulation frequency. The first candidate depths may include the nominal depth measured for a return, as well as the sum of the nominal depth and multiples of the nominal maximum range associated with the lower modulation frequency. The second candidate depths can include the depth measured for a return, as well as the sum of the nominal depth and multiples of the nominal maximum range associated with the higher modulation frequency. The techniques described herein including determining a disambiguated depth from the first candidate depths and the second candidate depths. For instance, the disambiguated depth may be based on the candidate depth of the first candidate depths and the candidate depth of the second candidate depths that are closest to each other. In some examples, the disambiguated depth can be an average, e.g., a weighted average, of these candidate depths. As will be appreciated, because the modulation frequencies are associated with different maximum unambiguous ranges, depth measurements larger than the maximum unambiguous ranges of the individual sensors can be disambiguated. Accordingly, depths beyond the maximum range distance(s) associated with the lower modulation frequency may be determined. In some examples, modulation frequencies may be chosen that are associated with coprime maximum unambiguous ranges, and depths up to the product of the ranges can be disambiguated with information from two successive frames.

In some examples, once a surface is determined, e.g., using the disambiguation techniques, to have a depth beyond the nominal maximum depth of the sensor in the first configuration, techniques described herein may further confirm the depth. For instance, and as noted above, the first modulation frequency is chosen to provide a relatively large nominal maximum depth. Accordingly, surfaces beyond the nominal maximum depth must be highly reflective to be imaged at the sensor. In some examples, the techniques described herein determine whether the surface having a disambiguated depth beyond the nominal maximum sensor depth also has an intensity equal to or above a threshold intensity. For instance, the intensity image may have intensity information for the surface, which information may be compared to a threshold intensity. When the measured intensity is equal to or above the threshold intensity, the surface may be confirmed to be beyond the nominal maximum depth. Alternatively, if the intensity does not equal or exceed the threshold intensity, the depth of the surface may be determined to be located at the nominal depth measured by the sensor in the first configuration, or at an actual depth determined according to additional techniques described herein.

Once a surface is confirmed to be beyond the nominal maximum sensor depth, in some examples the surface can be modeled at the correct, distant depth. Alternatively, some processes described herein may include generating filtered data that excludes returns associated with the surface, e.g., because such returns are too far in the distance and/or less reliable because of this distance. For example, in some implementations, the techniques described herein can filter pixels e.g., from a depth image and/or an intensity image based on the depth determined using the techniques described herein. In at least some instances, different threshold intensities may be applied to pixels associated with different depths. In at least one example, and as described herein, surfaces that are sensed and that are beyond a nominal maximum depth may generally be associated with highly reflective objects, such as retroreflectors or the like. Because these objects may be of less importance, e.g., because of their remote distance, pixels associated therewith that have a relatively higher intensity can be removed from consideration. In contrast, surfaces that are relatively closer to the sensor may be of more importance for navigation and autonomous vehicle, and thus a lower intensity threshold may be used to filter pixels.

In at least some examples, the intensity threshold may be applied across all depths for instance, any surfaces beyond a certain depth, such as the nominal maximum depth of the sensor, may be filtered with a first intensity threshold whereas pixels within the nominal maximum depth may be filtered with a second, lower threshold intensity. In other instances, however, different threshold intensities may be applied to groupings of pixels at different depths. Accordingly, pixels associated with a surface at a first depth in a first location in the environment may be filtered differently from a second group of pixels associated with a different object is similar depth in the environment. Based on the intensity thresholds, pixels may be filtered to generate filtered data that may be then passed to a computing system associated with the vehicle, e.g. to identify objects in and/or characteristics of the environment In some examples, once characteristics of the environment are determined according to the techniques described herein, the computing device of the autonomous vehicle may determine one or more trajectories for proceeding relative to the object(s). In some instances, depth and/or intensity information generated according to techniques described herein may be combined, or fused, with data from other sensor modalities to determine the one or more trajectories.

Techniques described herein may be directed to leveraging sensor and perception data to enable a vehicle, such as an autonomous vehicle, to navigate through an environment while circumventing objects in the environment. Techniques described herein can utilize information sensed about the objects in the environment, e.g., by a single, configurable sensor, to more accurately determine features of the objects. By capturing image data at different sensor configurations, depth data can be disambiguated. For example, techniques described herein may be faster and/or more robust than conventional techniques, as they may increase the reliability of depth and/or intensity information, alleviating the need for successive images. That is, techniques described herein provide a technological improvement over existing object detection, classification, prediction and/or navigation technology. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system in which sensor ambiguity and/or inconsistent sensor data exists may benefit from the techniques described. By way of non-limiting example, techniques described herein may be used on aircrafts, e.g., to identify and disambiguate depths associated with objects in an airspace or on the ground. Moreover, non-autonomous vehicles could also benefit from techniques described herein, e.g., for collision detection and/or avoidance systems.

FIGS. 1-9 provide additional details associated with the techniques described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 can be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled. In some instances, the techniques can be implemented in any system using machine vision and is not limited to vehicles.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions, for example, such that a first end of the vehicle 102 is the front end of the vehicle 102 when traveling in a first direction, and such that the first end becomes the rear end of the vehicle 102 when traveling in the opposite direction. Similarly, a second end of the vehicle 102 is the front end of the vehicle when traveling in the second direction, and such that the second end becomes the rear end of the vehicle 102 when traveling in the opposite direction. These example characteristics may facilitate greater maneuverability, for example, in small spaces or crowded environments, such as parking lots and/or urban areas.

A vehicle such as the example vehicle 102 can be used to travel through an environment and collect data. For example, the vehicle 102 can include one or more sensor systems 104. The sensor system(s) 104 can be, for example, one or more time-of-flight sensors, LIDAR sensors, RADAR sensors, SONAR sensors, image sensors, audio sensors, infrared sensors, location sensors, etc., or any combination thereof. Certain implementations described herein may be particularly well-suited for use with time-of-flight sensors, although other types of sensors also are contemplated. The sensor system(s) 104 may be disposed to capture sensor data associated with the environment. For example, the sensor data may be processed to identify and/or classify objects in the environment, e.g., trees, vehicles, pedestrians, buildings, road surfaces, signage, barriers, road marking, or the like.

As also illustrated in FIG. 1, the sensor system(s) 104 can include one or more processors 106 and memory 108 communicatively coupled to the processor(s) 106. The processor(s) 106 and/or the memory 108 may be physically integrated into the sensor, e.g., as an SoC, FPGA, ASIC, or the like, or, in some implementations, the processor(s) 106 and/or the memory 108 may be available to, e.g., connected to receive signals from and/or send signals to, the sensor system(s) 104. As discussed above, the one or more sensor system(s) 104 can determine the sensor data in various formats (e.g., a quadrature format, an intensity and depth format, and/or an unprojected format) using the one or more processors 106.

In the example of FIG. 1, the sensor system may include a time-of-flight sensor, which may be configured to emit a carrier (e.g., a signal) and receive, e.g., capture, a response carrier (e.g., a response signal) comprising the carrier reflected off a surface in the environment. The time-of-flight sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as depth image. For example, using the sensor data, the sensor system can determine depth and intensity values for each point associated with an object in an environment. In still further examples, the sensor system(s) can also determine the sensor data in an unprojected format. For example, an unprojection can refer to a transformation from a two-dimensional frame of reference into a three-dimensional frame of reference, while a projection can refer to a transformation from a three-dimensional frame of reference into a two-dimensional frame of reference. In some instances, processing techniques can determine a relative location of the sensor system(s) 104 (e.g., relative to one or more other sensors or systems) and can unproject the data into the three-dimensional representation based at least in part on the intensity and depth format, intrinsic and extrinsic information associated with the sensor system(s) 104 (e.g., focal length, center, lens parameters, height, direction, tilt, distortion, etc.), and the known location of the sensor system(s) 104. In some instances, the point can be unprojected into the three-dimensional frame, and the distances between the sensor system(s) 104 and the points in the three-dimensional frame can be determined (e.g., <x, y, z>).

As also illustrated in FIG. 1, the sensor system(s) 104 may be configured to output the sensor data, e.g., the intensity and depth information, the quadrature values, or the like, as a series of frames, e.g., image frames. For instance, the frames can include a stream of serially-generated (e.g., at a predetermined interval) frames including a first frame 110(1), a second frame 110(2), through an nth frame 110(N) (collectively referred to herein as "the frames 110"). Generally, each of the frames 110 may include the same type of data, e.g., data related to the intensity and depth information for each of a plurality of pixels comprising the receiver of the sensor, but techniques described herein may vary aspects of the sensor such that the data is captured at different sensor configurations. For example, as illustrated in FIG. 1, the first frame 110(1) includes first intensity information 112 and first depth data 114 captured at a first sensor configuration. Similarly, the second frame 110(2) includes second intensity information 116 and second depth information 118 captured at a second sensor configuration.

Techniques described herein can generate composite or blended data from multiple frames, e.g., from two or more of the frames 110. For example, the composite or blended data may better represent the environment and/or may have a higher associated confidence. For instance, and as illustrated in FIG. 1, data associated with the first frame 110(1), e.g., the first intensity information 112 and the first depth information 114, and data associated with the second frame 110(2), e.g., the second intensity information 116 and the second depth information 118, may be used to generate processed sensor data 120. In some examples, the processed sensor data can include a resolved depth 122 for a sensed object. For example, the resolved depth 122 may be determined based at least in part on the first depth information 114 and the second depth information 118, as detailed further herein. The processed sensor data 120 may also include filtered data 124. For instance, and as detailed further herein, the filtered data 124 may be a subset of the sensed data contained in the frames 110, e.g., a subset of intensity and/or depth pixels determined based on the first intensity information 112, the second intensity information 116, and/or the resolved depth 122 Straumann As noted above, the first frame 110(1) includes data captured by the sensor system(s) 104 in an associated first configuration and the second frame 110(2) includes data captured by the sensor system(s) 104 in an associated second configuration. In some examples, the different configurations of the sensor system 104 have different modulation frequencies. Time-of-flight sensors generally determine depth of an object by determining a phase shift of the reflected carrier signal, relative to the emitted carrier signal. The value of the phase shift directly corresponds to the depth of the object relative to the sensor system(s) 104. Conventionally, the modulation frequency of the time-of-flight sensor may be determined based on a maximum distance at which objects are expected to be. However, because the carrier signal repeats itself every period, e.g., the wave may be a sinusoid or the like, the returned depth may be ambiguous. By way of non-limiting example, the modulation frequency of the time-of-flight sensor may be chosen to determine depths of up to 5 meters. Thus, a phase shift of 30-degrees may correspond to a 2-meter depth, for example. However, that 2 meters may be a modulus associated with the phase shift, and in fact, the distance may be 7 meters, or 12 meters, or some different depth equal to the sum of the nominal, 2-meter depth and a multiple of the maximum, 5-meter nominal distance. Altering the modulation frequency of light emitted by the time-of-flight sensor will vary the nominal maximum depth at which the sensor will detect objects. More specifically, light at a higher modulation frequency will travel a relatively shorter distance before repeating an emission pattern (e.g., will have a shorter period) than light at a lower modulation frequency.

Techniques described herein alter the modulation frequency of the sensor system(s) 104 to receive measured depths for surfaces at multiple modulation frequencies. In some examples, the first modulation frequency and the second modulation frequency, e.g., for first and second sensor configurations, are chosen based on their associated nominal maximum depths. The first configuration may be chosen to have a relatively large nominal maximum depth, e.g., on the order of about 20 meters or more. In some examples, the modulation frequency for the first configuration is selected to be a relatively large depth beyond which surfaces may not impact operation of the vehicle 102. In contrast, the second configuration may be chosen to have a much smaller nominal maximum depth, e.g., on the order of a few meters, such as 2 to 5 meters. For example, the first configuration may provide a nominal maximum depth that is four or more times that of the nominal maximum depth associated with the second configuration. In one non-limiting example, the first configuration may have a modulation frequency of about 5 MHz or less, and the second configuration may have a modulation frequency of about 20 MHz or more. In some examples, it may be desirable that the modulation frequencies be selected to ensure that the larger nominal maximum depth (in the first configuration) is not an exact multiple of the smaller nominal maximum depth (in the second configuration). Moreover, some techniques described herein may use disambiguation techniques, and disambiguation may be improved by selecting two nominal maximum depths that are coprime, e.g., 5 m and 32 m. For example, when nominal maximum depths associated with the first and second configurations are coprime, depths up to the product of the two maximum depths (160 meters in the example) can be disambiguated using techniques described herein. In other implementations in which coprime numbers are not used, the depth to which values can be disambiguated may correspond to the lowest common multiple of the two depths, which may be a reason to avoid nominal maximum depths that are multiples.

As in the examples above, techniques according to this disclosure use configurations having relatively large differences in modulation frequencies, and therefore, relatively disparate nominal maximum depths, to provide more accurate depth measurements. For example, in processes detailed further below in connection with FIG. 2, techniques described herein can include determining an estimated depth of an object based on returns captured with the sensor system(s) 104 in the first configuration, e.g., the nominal depth of the measurement. Then, an actual depth of the object may be determined from the sensor data generated in the second configuration, e.g., as a candidate depth based on the nominal depth measured in the second configuration that is closest to the estimated depth. For example, techniques herein recognize that sensor returns at shorter modulation frequencies are more frequently erroneous and/or have a higher uncertainty than returns at higher modulation frequencies, which tend to be more accurate. Thus, the techniques described herein estimate a depth of a surface based on the lower modulation frequency return, but use higher modulation frequency return information to determine an actual depth, based on the estimate. For example, the depth determined according to these techniques may be the resolved depth 122.

As described, in some aspects of this disclosure, one or more sensor returns captured at a first sensor configuration are used to estimate a depth of a surface, e.g., as the nominal measured depth, and the actual depth is determined as the candidate depth from the second sensor configuration closest to the estimated depth. This process assumes that the measured surface is at a distance less than the nominal maximum depth of the sensor in the first configuration. In additional aspects of this disclosure, including aspects detailed below in connection with FIG. 3, aspects of this disclosure can also confirm this assumption. More specifically, and as detailed below, some implementations of this disclosure include determining a disambiguated depth based on depth data from the sensor in the first configuration and depth data from the sensor in the second configuration. For instance, examples include confirming that the disambiguated depth is below the nominal maximum depth of the sensor in the first configuration, e.g., for added certainty of the depth of the surface. In contrast, if the disambiguated depth is beyond the nominal maximum depth of the sensor in the first configuration, e.g., indicating the measured surface is farther away, processes described herein can perform other operations relative to the surface.

Determining more accurate depths of surfaces according to the techniques described herein can also improve data filtering. For example, once depths of surfaces are more accurately determined according to the techniques discussed above, the filtered data 124 can be generated by remove data, e.g., pixels, from the sensor data that are not relevant to processing at the vehicle. Without limitation, portions of the sensor data that are not indicative of objects relative to which the vehicle travels may be filtered out, e.g., to reduce the amount of data sent from the sensor. For example, and as detailed further below in connection with FIG. 4, techniques described herein can filter data by comparing intensity information, e.g., from the first intensity data 112 and/or the second intensity data 116, to a threshold intensity. The threshold intensity may vary based on depth information. For instance, pixels having a greater depth, e.g., associated with surfaces relatively farther from the sensor, may be filtered using a higher intensity threshold, whereas pixels having a smaller depth, e.g., associated with surfaces closer to the sensor, may be filtered using a lower intensity threshold. These and other examples are described in more detail below.

Figure 2:
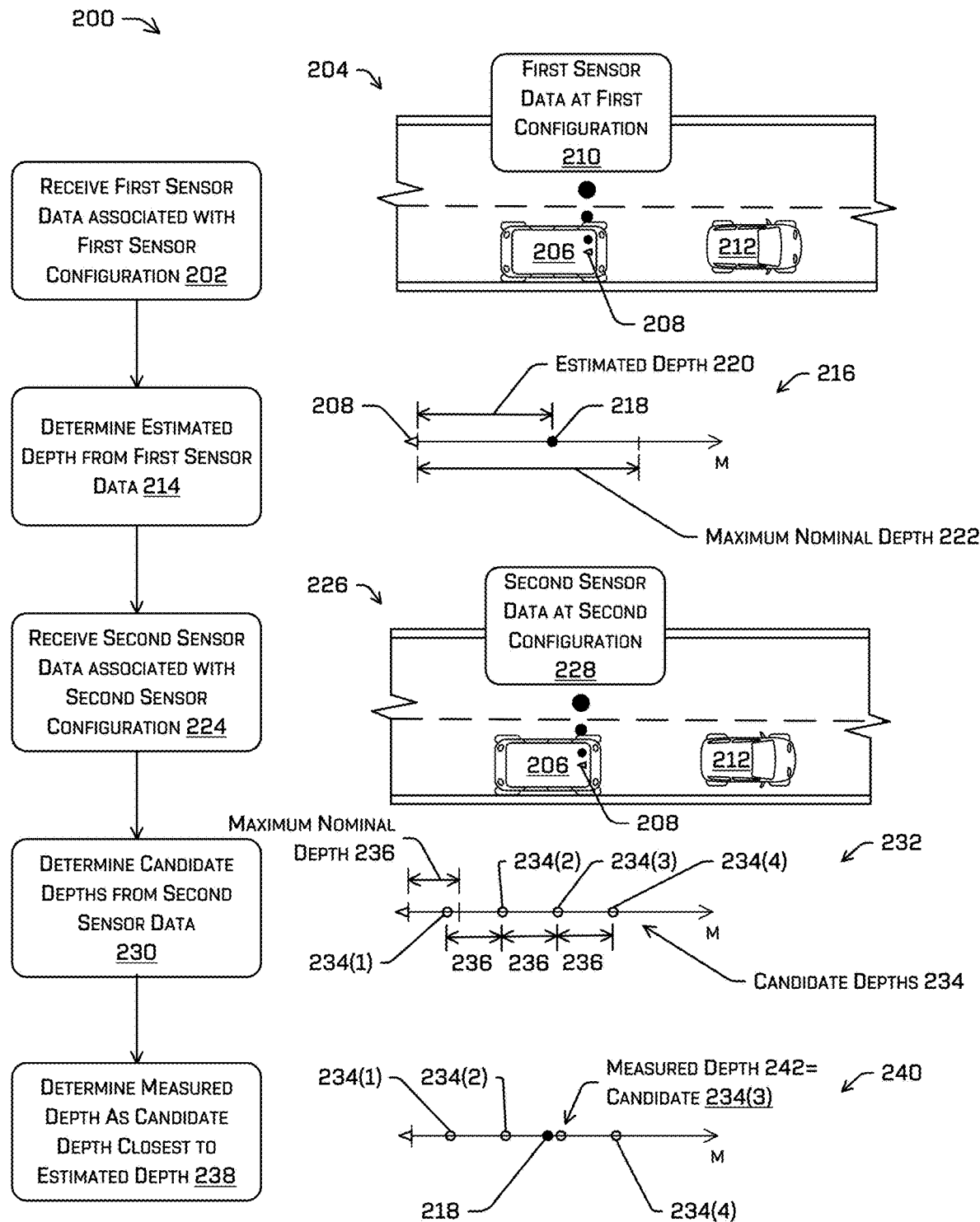
FIG. 2 is a graphical flow chart illustrating and describing depth resolution from time-of-flight sensor data, as described herein.

FIG. 2 includes textual and graphical flowcharts illustrative of a process 200 for determining a depth of a sensed surface, according to implementations of this disclosure. For example, the process 200 can be implemented using components and systems illustrated in FIG. 1 and described above, although the process 200 is not limited to being performed by such components and systems. Moreover, the components and systems of FIG. 1 are not limited to performing the process 200.

In more detail, the process 200 can include an operation 202 that includes receiving first sensor data associated with a first sensor configuration. As noted above, techniques described herein may be particularly applicable for use with time-of-flight sensors, and the example of FIG. 2 may use time-of-flight sensors as one specific example. The disclosure is not limited to use with time-of-flight sensors, as techniques described herein may be applicable to other types of sensors that may be adversely affected by glare. In some examples, the operation 202 can include receiving both depth and intensity data measured by the time-of-flight sensor, although only the depth information may be required for aspects of FIG. 2.

An example 204 accompanying the operation 202 illustrates a vehicle 206, which may be the vehicle 102 in some examples. One or more time-of-flight sensors 208 are mounted on the vehicle 206, e.g., to sense an environment surrounding the vehicle 206. For instance, the time-of-flight sensor(s) 208 may be arranged to sense objects generally in a direction of travel of the vehicle 206, although the sensors may be otherwise disposed and more sensors than the one illustrated may be present. The time-of-flight sensor(s) 208 may be configured to generate first sensor data 210, which includes depth information (and in some instances may also include intensity information). In at least some examples, the depth information can include or be embodied as a depth image and the intensity information can include or be embodied as an intensity image. For example, the depth image can represent a depth of sensed objects in a scene on a pixel-by-pixel basis and the intensity image can represent an intensity (e.g., brightness) of sensed objects in the scene on the same pixel-by-pixel basis. The depth image and the intensity image include information about objects in an environment of the vehicle. A vehicle 212 travelling on a road proximate the vehicle 206 may be an example of such an object. The first sensor data 210 is generated with the time-of-flight sensor 206 in a first configuration. For example, the first configuration may correspond to a first, relatively low modulation frequency. For instance, the first configuration may have a modulation frequency of about 5 MHz or less, which may be selected to have a relatively large nominal maximum depth, as described herein.

At an operation 214, the process 200 can include determining an estimated depth from the first sensor data. As noted above, the first sensor data 210 can include depth or range data and/or data from which depth or range data can be generated. For instance, a depth or range of a surface may be determined based on a time it takes light emitted by the sensor 208 in the first configuration to reflect off the surface and return to the sensor. An example 216 accompanying the operation 214 demonstrates a return 218 associated with the sensor 208. For example, the return may be associated with the vehicle 212 or some other object in the environment of the vehicle 206. The return 218 (as with all returns) is a measured distance, e.g., in meters, from the sensor 208. In this example, the measured distance of the return 218 is an estimated depth 220 of the object (e.g., the vehicle 212).

Because the first configuration of the sensor 208 is associated with a relatively low modulation frequency, the sensor 208 in the first configuration has a relatively large nominal maximum depth 222. In examples, the modulation frequency is chosen such that the nominal maximum depth 222 is likely to be larger than a depth at which most objects that could be sensed by the sensor 208 are located. For instance, objects beyond a certain distance or depth from the sensor 208 are likely to lack sufficient reflectivity that they can be sensed by the sensor 208. In some aspects of this disclosure, the nominal maximum depth 222 may be equal to or greater than about 30 meters or more. Because of the foregoing, the nominal measured depth of each surface, or associated with each return, is likely to be the actual depth of the surface. This is in contrast to configurations with higher modulation frequencies (and lower nominal maximum depths) in which the measured depth is ambiguous, e.g., the measured depth could be the actual depth or it could be the measured depth plus some multiple of the nominal maximum depth associated with the configuration. In the first configuration, while the sensed depth of the return 218 is likely to be the actual depth of the return, the relatively low modulation frequency may be more prone to errors or have a lower associated confidence. In aspects of this disclosure, the estimated depth 220 may be the actual depth, or depth measured by the sensor in the first configuration, but the depth may be "estimated" because of the lower associated confidence or higher tolerance resulting from the lower frequency.

At an operation 224, the process 200 can include receiving second sensor data associated with a second sensor configuration. As noted above, techniques described herein may be particularly applicable for use with time-of-flight sensors. An example 226 accompanying the operation 224 illustrates the vehicle 206 the sensor 208 mounted on the vehicle 206. In the example 226, the sensor 208 may be configured to generate second sensor data 228, which includes depth information (and in some instances may also include intensity information). In at least some examples, the depth information can include or be embodied as a depth image and the intensity information can include or be embodied as an intensity image. For example, the depth image can represent a depth of sensed objects in a scene on a pixel-by-pixel basis and the intensity image can represent an intensity (e.g., brightness) of sensed objects in the scene on the same pixel-by-pixel basis. The depth image and the intensity image include information about objects in an environment of the vehicle. The second sensor data 228 is generated with the time-of-flight sensor 208 in a second configuration. For example, the second configuration may correspond to a second, relatively high modulation frequency. For instance, the second configuration may have a modulation frequency of about 15 MHz to 20 MHz or more, which may be selected to have a relatively small nominal maximum depth, as described herein.

In the example 204 the sensor 208 is configured in the first configuration to generate the first sensor data 210 and in the example 226 the sensor 208 is configured in the second configuration to generate the second sensor data 228. In other examples, however, the first sensor data 210 may be generated by a first sensor, e.g., configured in the first configuration, and the second sensor data 228 may be generated by a second sensor, e.g., configured in the second configuration. For instance, returns from a first sensor on the vehicle 206 may be correlated with returns from a second sensor on the vehicle 206, e.g., such that returns associated with a same surface are grouped or otherwise associated. By way of example and not limitation, returns associated with the vehicle 212 may be associated regardless of the sensor detecting the vehicle 212. In such examples, the first sensor and the second sensor will have overlapping fields of view.

At an operation 230, the process 200 can include determining candidate depths from the second sensor data. As noted above, the second sensor data 228 can include depth or range data and/or data from which depth or range data can be generated. For instance, a depth or range of a surface may be determined based on a time it takes light emitted by the sensor 208 in the second configuration to reflect off the surface and return to the sensor. Because the second configuration has a relative high modulation frequency, it also has a relatively small nominal maximum depth. In some examples, the nominal maximum depth associated with the second configuration can be 5 meters or less. As a result, the depth measured in the second configuration is ambiguous. That is, the measured depth may be the actual depth of the surface or the actual depth plus some multiple of the nominal maximum depth associated with the second configuration. An example 232 accompanying the operation 230 demonstrates a plurality of candidate depths 234 associated with a measured return at the sensor 208. More specifically, the candidate depths 234 include a first candidate depth 234(1) that corresponds to the depth determined by the sensor in the second configuration, e.g., the measured depth. The sensor 208 in the second configuration has a nominal maximum depth 236, which, like the nominal maximum depth 222, is the maximum depth that the sensor 208 in the second configuration will determine, e.g., based on the modulation frequency of the emitted light. However, and because of the relatively high modulation frequency associated with the second configuration, the sensor will generate returns for surfaces beyond the nominal maximum depth 236. The determined depths of those returns will be less than the nominal maximum depth 236, but the determined depth may be a remainder. The actual depth of those surfaces will be ambiguous. Specifically, and as shown in the example 232, the actual depth of the surface could be any of the candidate depths 234. In the illustration, the first candidate depth 234(1), as noted above, is the measured depth, a second candidate depth 234(2) is the sum of the measured depth and the nominal maximum depth 236, a third candidate depth 234(3) is the sum of the measured depth and two times the nominal maximum depth 236, and a fourth candidate depth 234(4) is the sum of the measured depth and three times the nominal maximum depth 236. Although the candidate depths 234 are illustrated as including four candidate depths, additional candidate depths will correspond to other sums of the measured depth and multiples of the nominal maximum depth 236.

At an operation 238, the process 200 include determining a measured depth as the candidate depth closest to the estimated depth. As noted above, the sensor 208 generates returns in a first configuration and in a second configuration (or different sensors in the different configurations generate the returns). An example 240 accompanying the operation 238 shows the return 218 (corresponding to the first sensor configuration) and the candidate depths 234 (corresponding to the second sensor configuration) on the same plot line. In this example, the return 218 and the candidate depths are associated with the same surface, e.g., which may be a surface of the vehicle 212. As illustrated in the example 240, a measured depth 242 for the surface according to the process 200 is the third candidate depth 234(3), because the third candidate depth 234(3) is the closest of the candidate depths 234 to the estimated depth 220. In examples, the measured depth 242 may be the depth used as an actual depth of the object, e.g., for downstream processing as described herein.

According to the example of FIG. 2, the first sensor data 210 and the second sensor data 228 both include information about the same surface(s), e.g., about the vehicle 212. Some conventional systems may merge different data associated with the same surface, e.g., using disambiguation techniques, to determine a measured distance of the surface. For instance, the measured distance in these conventional systems can be an average, weighted average, or the like, of depths determined in multiple configurations and/or sensed at different times. In contrast, because aspects of the current disclosure use a relatively low modulation frequency in the first configuration, the depth measured in the first configuration, e.g., the measured depth of the first return 218, is not ambiguous and can therefore be used as the estimated depth 220, as discussed in connection with the example 216. However, the depth measured in the second configuration is ambiguous, as described in connection with the example 232. Although the depth measured in the second configuration is ambiguous, it is also a more accurate depth, e.g., because of the higher modulation frequency. Thus, aspects of this disclosure may use only the depth information determined from the second configuration as the distance to the surface, but the estimated depth 220 is used to determine which of the candidate depths 234 is the correct depth. Accordingly, unlike techniques that determine an average, weighted average, or other formula including two depth measurements to determine a measured depth, the current disclosure uses the more accurate measurement, informed by the less accurate measurement.

As noted, the first configuration and the second configuration are chosen to provide the nominal maximum depths 222, 236 that vary significantly. For instance, the nominal maximum depth 222 in the first configuration may be on the order of three or more times the nominal maximum depth 236 in the second configuration. As also described above, the first configuration may be determined such that the nominal maximum depth is sufficiently large that most objects that can be sensed will be within the nominal maximum depth, thus allowing the measured depth determined with the first configuration to be used as the estimated depth. However, in some limited examples it may be that an object sensed in the first configuration is actually beyond the nominal maximum distance, e.g., the measured distance is a remainder. For instance, highly reflective objects, such as retroreflectors, may be capable of being sensed at relatively far distances, e.g., beyond 35 meters or more. Aspects of this disclosure also are suited to determine whether a sensed object is beyond the nominal maximum depth of the sensor in the first configuration.

Figure 3:
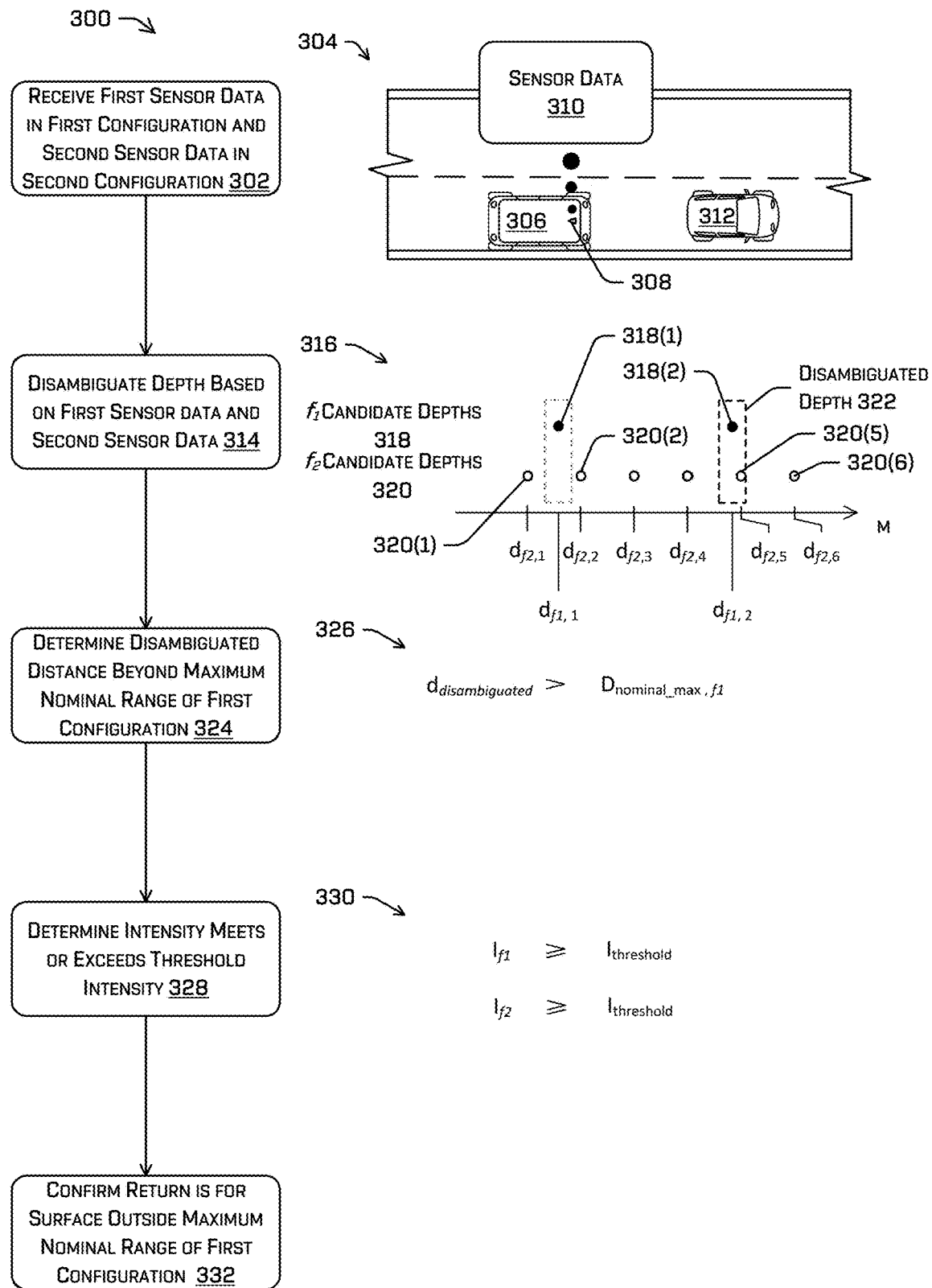
FIG. 3 is a graphical flow chart illustrating and describing processes for determining whether time-of-flight data is beyond a nominal maximum depth of the time-of-flight sensor, as described herein.

FIG. 3 includes textual and graphical flowcharts illustrative of a process 300 for determining whether a sensed surface is beyond a sensor nominal maximum depth, according to implementations of this disclosure. For example, the process 300 can be implemented using components and systems illustrated in FIG. 1 and described above, although the process 300 is not limited to being performed by such components and systems. Moreover, the components and systems of FIG. 1 are not limited to performing the process 300.

In more detail, the process 300 includes an operation 302 that includes receiving first sensor data and second sensor data. For example, the first sensor data is associated with a first sensor configuration and the second sensor data is associated with a second sensor configuration. The first sensor data received at the operation 302 can be the first sensor data 210 and/or the second sensor data can be the second sensor data 228 discussed above in connection with FIG. 2.

An example 304 accompanying the operation 302 illustrates a vehicle 306, which may be the vehicle 102 and/or the vehicle 206 in some examples. One or more time-of-flight sensors 308 are mounted on the vehicle 306, e.g., to sense an environment surrounding the vehicle 306. For instance, the time-of-flight sensor(s) 308 may be arranged to sense objects generally in a direction of travel of the vehicle 306, although the sensors may be otherwise disposed and more sensors than the one illustrated may be present. In examples, the sensor(s) 308 may correspond to the sensor(s) 208. The sensor(s) 308 may be configured to generate sensor data 310 which includes depth information and intensity information. In at least some examples, the depth information can include or be embodied as a depth image and the intensity information can include or be embodied as an intensity image. For example, the depth image can represent a depth of sensed objects in a scene on a pixel-by-pixel basis and the intensity image can represent an intensity (e.g., brightness) of sensed objects in the scene on the same pixel-by-pixel basis. The depth image and the intensity image include information about objects in an environment of the vehicle. A vehicle 312 travelling on a road proximate the vehicle 306 may be an example of such an object. The sensor data 310 includes first data generated with the sensor(s) 308 in a first configuration and second data generated with the sensor(s) 308 in a second configuration. For example, the first configuration may correspond to a first, relatively low modulation frequency. For instance, the first configuration may have a relatively low modulation frequency, e.g., of about 5 MHz or less, which may be selected to have a relatively large nominal maximum depth, as described herein. In contrast, the second configuration may correspond to a second, relatively high modulation frequency. For instance, the second configuration may have a modulation frequency of about 15 MHz to 20 MHz or higher, which may be selected to have a relatively small nominal maximum depth, as described herein. Without limitation, the sensor data 310 can include the first sensor data 210 as the first data and the second sensor data 228 as the second data.

At an operation 314, the process 300 can also include disambiguating a depth based on the first sensor data and the second sensor data. For instance, the operation 314 can include comparing first candidate depths from the first sensor data with second candidate depths from the second sensor data. An example 316 accompanying the operation 314 illustrates this concept. Specifically, the example 316 shows first candidate depths 318 including an individual candidate depth 318(1) corresponding to a measured depth associated with the first configuration and an individual candidate depth 318(2) corresponding to the sum of the measured depth and the nominal maximum depth of the sensor in the first configuration. The example 316 also shows second candidate depths 320 including an individual candidate depth 320(1) corresponding to a measured depth associated with the second configuration and additional candidate depths (e.g., candidate depths 320(2)-320(6)) corresponding to the sum of the measured depth and the nominal maximum depth of the sensor in the second configuration. Although the example 316 shows only two of the first candidate depths 318 and six of the second candidate depths 320, more candidate depths can also be considered. In some instances, the individual candidate depth 318(1) may correspond to the depth of the return 218 in FIG. 2 and the individual candidate depth 318(2) may correspond to a depth corresponding to a sum of the depth of the return 218 and the nominal maximum depth 222. Also in the example 316, the candidate depths 320 may correspond to the candidate depths 234.

In the example 316, the individual candidate depth 318(2) of the first candidate depths 318 and the individual candidate depth 320(5) of the second candidate depths 320 are closest to each other, e.g., within a threshold distance. This distance is shown in FIG. 2 as dashed rectangles around the first candidate depths 318. Because the individual candidate depth 318(2) of the first candidate depths 318 and the individual candidate depth 320(5) of the second candidate depths 320 are closest to each other, a disambiguated depth 322 is determined using those values. In some examples, the disambiguated depth 322 may be a range indicated by the rectangle associated with the individual candidate depth 318(2). In other examples, the disambiguated depth 322 can be an average of the depths represented by the individual candidate depths 318(2), 320(5), a weighted average of those depths, or some other function of the two depths. In still further examples, one of the individual candidate depths 318(2), 320(5) may be used as the disambiguated depth 322.

As detailed above in connection with FIG. 2 and elsewhere herein, because the first configuration of the sensor 308 is associated with a relatively low modulation frequency, the sensor 308 in the first configuration has a relatively large nominal maximum depth wherein the second configuration, which is associated with a relatively higher modulation frequency and thus has a relatively smaller nominal maximum depth. This is illustrated in the example 316 by the larger distance between the first candidate depths 318 (which are separated by a first nominal maximum depth associated with the first configuration) that the distance between the second candidate depths 320 (which are separated by a second nominal maximum depth associated with the second configuration). In examples, the modulation frequency is chosen such that the first nominal maximum depth is likely to be larger than a depth at which most objects that could be sensed by the sensor 308 are located. However, and as noted above, some surfaces, especially highly reflective surfaces, that are beyond the first nominal maximum depth may be sensed by the sensor 308.

At an operation 324, the process 300 includes determining that the disambiguated distance is beyond a nominal range of the sensor in the first configuration. More specifically, and as shown in an example 326 accompanying the operation 324, the disambiguated depth 322 is compared to the nominal maximum depth associated with the first configuration of the sensor. If the disambiguated distance 322 is larger than the nominal maximum depth associated with the first configuration, further investigation of the return and/or the surface is warranted, because, as noted above, the first configuration includes a low modulation frequency selected to provide a larger nominal maximum depth that is greater than the depth at which most objects will be detected.

At an operation 328, the process 300 includes determining whether an intensity meets or exceeds a threshold intensity. For example, and as noted above, the sensor data can include first depth information and first intensity information (generated in the first configuration) and second depth information second intensity information (generated in the second configuration). The depth information and the intensity information are correlated, that is, each return at the sensor can include depth information for the return (e.g., a depth pixel) and intensity information for the return (e.g., an intensity pixel). Thus, at the operation 328 the process 330 can include determining whether intensity information (e.g., from intensity pixel(s)) for the return(s) determined to be beyond the nominal maximum depth associated with the first configuration are equal to or greater than a threshold intensity. An example 330 shows that first intensity information associated with the first configuration, e.g., having the first modulation frequency, $f_1$, and second intensity information associated with the second configuration, e.g., having the second modulation frequency, $f_2$, are compared to the intensity threshold. In some examples only one of the first intensity information or the second intensity information may be compared to the intensity threshold. As detailed herein, surfaces beyond the nominal maximum depth associated with the first configuration are unlikely to be sensed unless they are highly reflective. Such highly reflective surfaces will have a relatively high intensity measured at the sensor 308. In examples, the threshold intensity may be determined heuristically or experimentally, e.g., by sensing objects with known properties at distances beyond the nominal maximum depth associated with the first configuration. Also in some examples, the threshold intensity may be depth dependent, e.g., greater for greater disambiguated depths and lower for relatively shorter disambiguated depths. In examples in which the intensity does not meet or exceed the threshold distance, yet the disambiguated distance exceeds the nominal maximum depth associated with the first sensor configuration, the pixel may be determined to be unreliable, or in some instances, At an operation 332, the process 300 includes confirming that the return is associated with a surface outside the nominal maximum range of the sensor in the first configuration. For instance, the disambiguated depth being beyond the first nominal maximum depth associated with the first configuration will suggest that the return is beyond the nominal maximum depth. However, because of sensor errors, inaccuracies, or the like, the determination of the disambiguated depth may be inaccurate. The process 300 uses the associated intensity being equal to or above the threshold intensity to further confirm that the return is likely beyond the nominal maximum depth. In some instances, as described herein, pixels that are confirmed to be associated with surfaces beyond the nominal maximum depth may be excluded or filtered out. In still further instances, the surfaces may be modeled or otherwise determined to be at these relatively greater distances.

As described in connection with the process 200 and the process 300, aspects of this disclosure relate to determining distances of measured surfaces using depth data generated from multiple sensor configurations. Moreover, these determined depths may be more accurate than depths determined using conventional techniques. This disclosure also includes improved techniques for filtering data based on this improved depth information.

Figure 4:
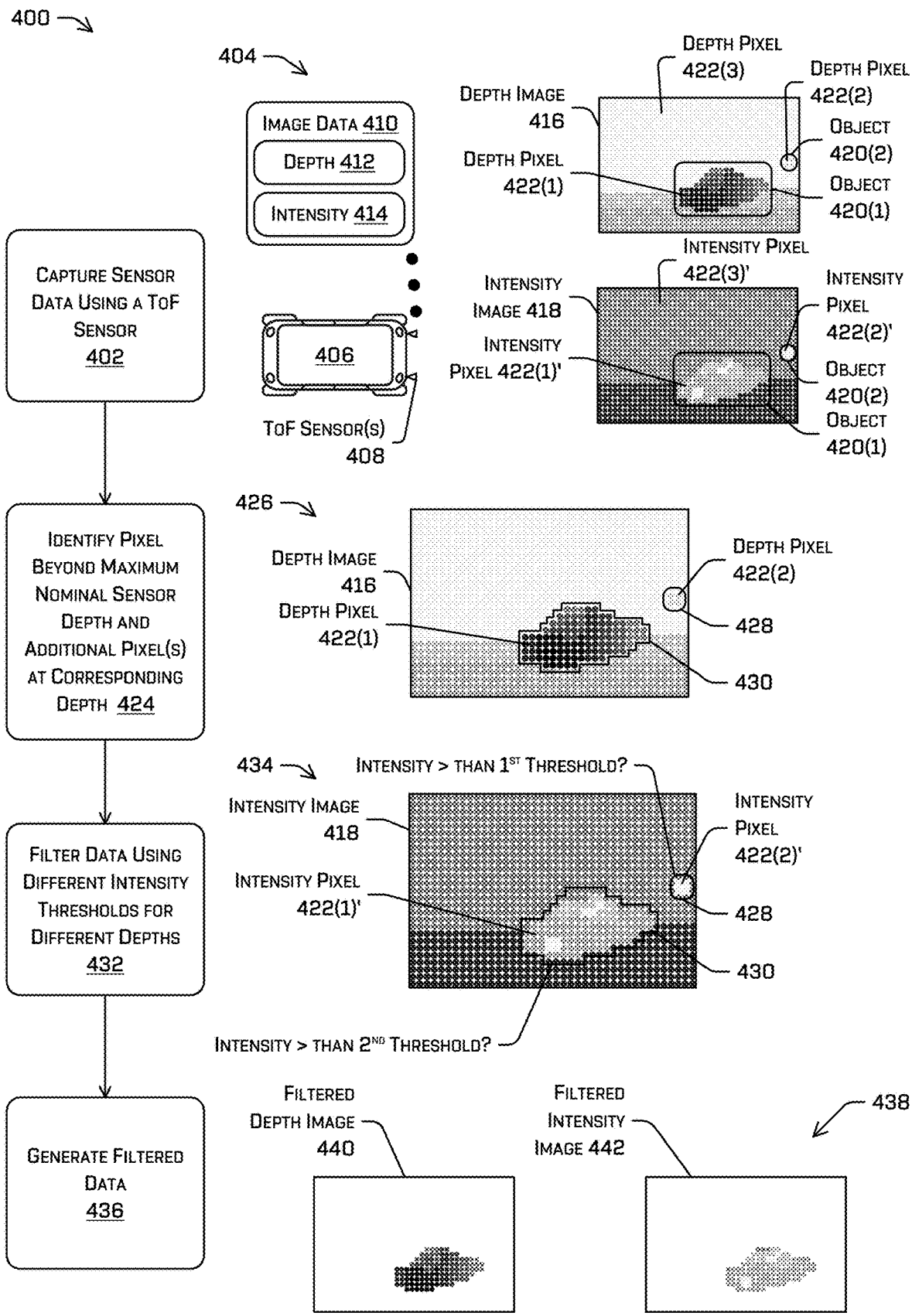
FIG. 4 is a graphical flow chart illustrating and describing pixel filtering based on depth information, as described herein.

FIG. 4 includes textual and graphical flowcharts illustrative of a process 400 for filtering pixels based on determined depth, according to implementations of this disclosure. For example, the process 400 can be implemented using components and systems illustrated in FIG. 1 and described above, although the process 400 is not limited to being performed by such components and systems. Moreover, the components and systems of FIG. 1 are not limited to performing the process 400.

In more detail, the process 400 can include an operation 402 that includes capturing sensor data using a time-of-flight sensor. As noted above, techniques described herein may be particularly applicable to use with time-of-flight sensors, and the example of FIG. 4 uses time-of-flight sensors as one specific example. The disclosure is not limited to use with time-of-flight sensors, as techniques described herein may be applicable to other types of ranging sensors. In some examples, the operation 402 can include receiving both depth and intensity data measured by the time-of-flight sensor.

An example 404 accompanying the operation 402 illustrates a vehicle 406, which may be the vehicle 102, the vehicle 206, and/or the vehicle 306 in some examples. One or more time-of-flight sensors 408 are mounted on the vehicle 406, e.g., to sense an environment surrounding the vehicle 406. For instance, the time-of-flight sensor(s) 408 may be arranged to sense objects generally in a direction of travel of the vehicle 406, although the sensors may be otherwise disposed and more or fewer sensors than the two illustrated may be present. The time-of-flight sensor(s) 408 may be configured to generate sensor or image data 410, which can include depth information 412 and intensity information 414. In at least some examples, the depth information 412 can include or be embodied as a depth image 416 and the intensity information 414 can include or be embodied as an intensity image 418. As illustrated in the example 404, the depth image 416 can represent a depth of sensed objects (or surfaces) in a scene on a pixel-by-pixel basis and the intensity image 418 can represent an intensity (e.g., brightness) of sensed objects (or surfaces) in the scene on the same pixel-by-pixel basis. In the example, the depth image 416 and the intensity image 418 may include information about an first object 420(1), which, for example, may be a vehicle travelling on a road proximate the vehicle 406, and information about a second object 420(2), which, for example, may be a street sign.

The depth image 416 and the intensity image 418 may be generated at substantially simultaneously the same time. In the representation of the depth image 416, relatively lighter pixels may represent objects that are farther away (e.g., background objects) whereas as relatively darker pixels may represent relatively closer objects. The example 404 specifically identifies a first depth pixel 422(1) in the depth image 416 associated with the first object 420(1), a second depth pixel 422(2) associated with the second object 420(2), and a third depth pixel 422(3) associated with a background of the sensed environment. The example 404 also outlines the object 420 in the intensity image 418. In the intensity image 418, relatively lighter pixels may represent higher intensity whereas relatively darker pixels may represent lower intensity. The example 404 specifically identifies a first intensity pixel 422(1)', a second intensity pixel 422(2)', and a third intensity pixel 422(3)' in the intensity image 418. The first depth pixel 422(1) and the first intensity pixel 422(1)' generally correspond to the same portion of the first object 420(1), e.g., they are associated and include intensity and depth information, respectively, for the same portion of the same surface in the environment. Similarly, the second depth pixel 422(2) and the second intensity pixel 422(2)' generally correspond to the same portion of the second object 420(2), and the third depth pixel 422(3) and the third intensity pixel 422(3)' generally correspond to the same portion of the background of the environment, e.g., they are associated and include intensity and depth information, respectively, for the same portion of the same surface or feature on the second object 420(2) and the background, respectively. Stated differently, the depth associated with the first depth pixel 422(1) and the intensity associated with the first intensity pixel 422(1)' may describe attributes (depth and intensity) of the same pixel or the same return.

In the example 404, the depth image 416 and the intensity image 418 may represent a single instance of the image data 410 and may be generated with the sensor(s) 408 in a single sensor configuration. In examples, and as described herein, the sensor(s) 408 may be capable of capturing sensor data at a plurality of sensor configurations, including a first configuration associated with a first modulation frequency and a second configuration associated with a second modulation frequency. Without limitation, and for example only, a first instance of the image data 410 may correspond to the first sensor data 210 and a second instance of the image data 410 may correspond to second sensor data 228. In other examples, an instance of the image data 410 may correspond to a blending or combination of one or more instances of the first sensor data 210 and one or more instances of the second sensor data 228. For example, and without limitation, the depth values of the depth pixels may be determined using the techniques discussed herein in connection with FIG. 2 and/or FIG. 3, detailed above.

At an operation 424, the process 400 can include identifying a pixel beyond a nominal maximum sensor depth and additional pixel(s) at a corresponding depth. An example 426 accompanying the operation 424 shows the depth image 416. In the depth image 416, the second depth pixel 422(2), which is associated with the object 420(2), has a depth that exceeds a nominal maximum depth associated with the sensor(s) 408. In this example, as in other examples of this disclosure, the nominal maximum depth may be associated with a first sensor configuration chosen to have a relatively large nominal maximum depth. For instance, the depth pixel may be associated with a surface determined using the process 300. In the example 426, pixels immediately surrounding the second depth pixel 422(2), e.g., other pixels associated with the object and having a depth similar to those of the second depth pixel 422(2), may be grouped with the second depth pixel 422(2), e.g., as a subset 428 of the depth pixels. In some instances, the subset 428 may include pixels having the same depth. In other examples, the subset 428 may include pixels within a threshold depth, e.g., within 0.1 or 0.5 meter, of a neighboring pixel. For instance, neighboring pixels within the threshold depth may be grouped together to generate the subset 428. In examples, the subset 428 may include only a continuous group of pixels, e.g., with each pixel in the subset 428 having at least one neighbor included. In other examples, the subset 428 can include discontinuous pixels, e.g., one or more pixels having the depth or a depth within a range, but not neighboring any other pixel(s) having the same depth.

The example 426 also shows a second subset 430 of the depth pixels. The second subset 430 includes pixels, including the first depth pixel 422(1), that may be associated with a depth or range of depths different from the subset 428. In the example, the second subset 430 is generally associated with the first object 420(1). As indicated by the differently colored pixels within the second subset 430 in the depth image 416, there is some variation in depth among the pixels. As noted above, the pixels in the subset 430 may be within a range of depths and/or each of the pixels may have a depth that is within a threshold depth of a neighboring pixel. In at least some example, the Subsets of pixels in addition to the first subset 428 and the second subset 430 also may be identified.

In the example 426, the first subset 428 of pixels are beyond the nominal maximum sensor depth and the second subset 420 are less than the nominal maximum sensor depth, although the first subset 428 may include pixels that are associated with depths less than the nominal maximum sensor depth. For example, and without limitation, the first subset 428 may include pixels that are determined to be beyond the nominal maximum sensor depth using the process 300 described herein. The second subset 430 may include pixels the depth of which are determined using the process 200 described herein. However, other processes for determining depths may also be used.

At an operation 432, the process 400 can also include filtering the sensor data using different intensity thresholds for different depths. For instance, individual subsets of the pixels may be filtered using different intensity thresholds. An example 434 accompanying the operation 432 shows the intensity image 418. The example 434 also shows that the pixels in the first subset 428 are compared to a first intensity threshold and that the pixels in the second subset 430 are compared to a second intensity threshold. The thresholds may be determined to filter out an increased number of pixels that are not associated with a detected object proximate the vehicle 206, while retaining a maximum number of pixels that are associated with such detected objects. For instance, the first threshold may be relatively higher such that more pixels farther away are filtered, whereas the second threshold is relatively lower, such that more pixels associated with nearer objects are kept, thereby retaining more information about objects closer to the sensor.

At operation 436, the process 400 can include generating filtered data. For example, the operation 436 (and/or the operation 432) can include comparing an intensity value e.g., a measured intensity value contained in the intensity image 418, to the threshold discussed in connection with the operation 432. In examples, if the measured intensity associated with the intensity pixel is lower than the threshold intensity, the pixel is discarded, removed, ignored, or otherwise filtered out (e.g., in either one or both of the intensity image 218 and the depth image 216). Alternatively, if the measured intensity is equal to or greater than the threshold intensity, the pixel is retained. In an example 434 accompanying the operation 432, filtered data can include a filtered depth image 436 and a filtered intensity image 438. As illustrated, the filtered depth image 236 and the filtered intensity image 238 may include information about depth pixels and intensity pixels associated with the first object 420(1) in the dynamic range of the time-of-flight sensor(s) 408, but may exclude pixels associated with background elements or with objects outside the dynamic range, such as the second object 420(2). With particular reference to the intensity image 418 and the filtered intensity image 442, note that the intensity pixel 422(2)' is filtered out, despite having a higher intensity than some pixels retained from the first subset 430.

Figure 5:
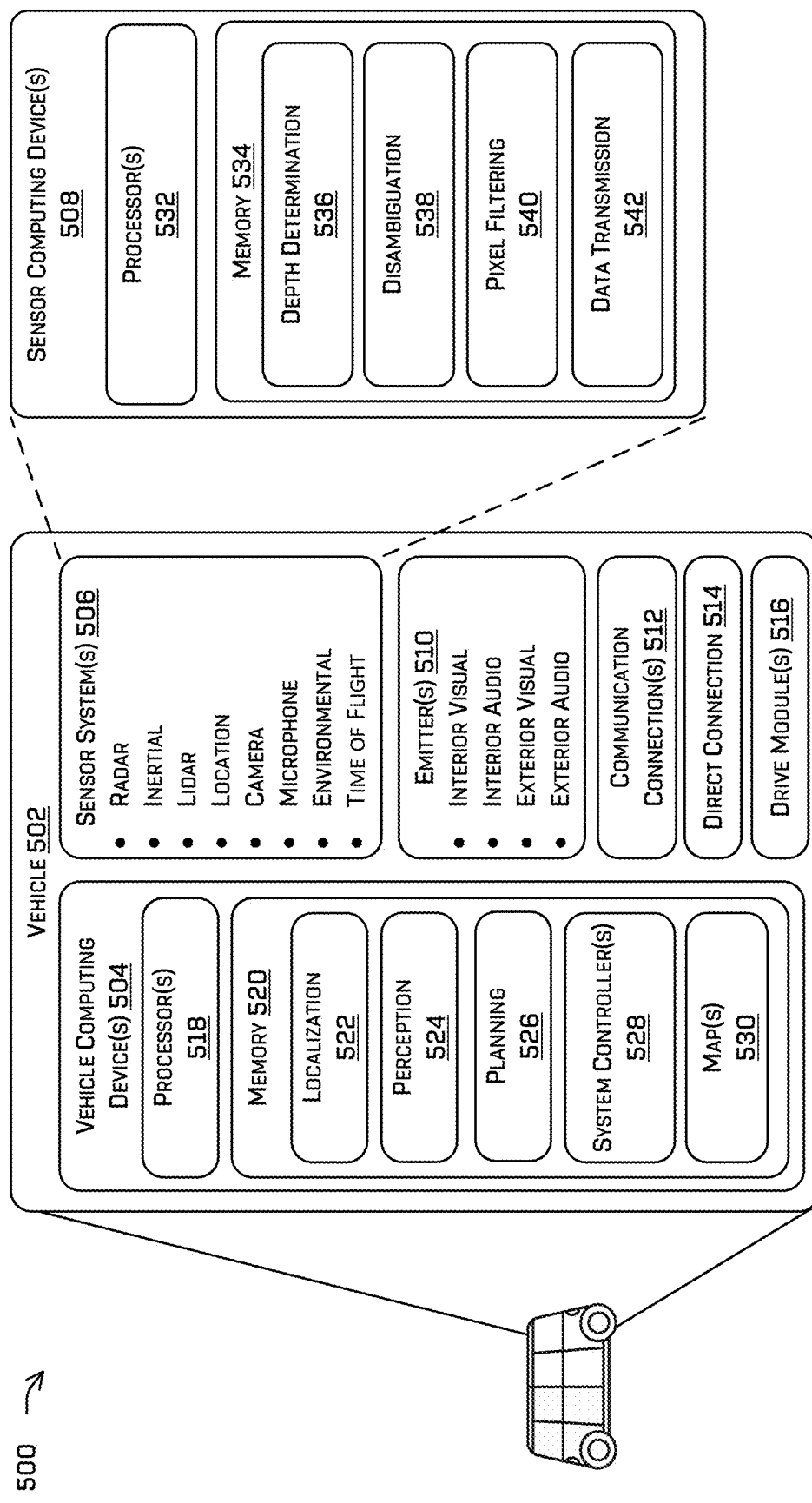
FIG. 5 is a block diagram illustrating components of an autonomous vehicle and an example sensing system, as described herein.

FIG. 5 depicts a block diagram of an example system 500 for implementing the techniques discussed herein. In at least one example, the system 500 can include a vehicle 502, which can be similar to (or the same as) the vehicle 102 described above with reference to FIG. 1. In the illustrated example 500, the vehicle 502 is an autonomous vehicle; however, the vehicle 502 can be any other type of vehicle.

The vehicle 502 can include one or more computing devices 504, one or more sensor systems 506, which may include one or more sensor computing devices 508, one or more emitter(s) 510, one or more communication connections 512, at least one direct connection 514 (e.g., for physically coupling with the vehicle 502 to exchange data and/or to provide power), and one or more drive modules 516. In some instances, the vehicle 502 can include more or fewer instances of the computing device(s) 504. The one or more sensor systems 506 can be configured to capture sensor data associated with an environment.

The vehicle computing device(s) 504 can include one or more processors 518 and memory 534 communicatively coupled with the one or more processors 518. In at least one instance, the one or more processors 518 can be similar to the processor 106 and the memory 534 can be similar to the memory 108 described above with reference to FIG. 1. In the illustrated example, the memory 534 of the computing device(s) 504 stores a localization component 522, a perception component 524, a planning component 526, one or more system controllers 528, and one or more maps 530. Though depicted as residing in the memory 534 for illustrative purposes, it is contemplated that the localization component 522, the perception component 524, the planning component 526, and the one or more system controllers 528 can additionally, or alternatively, be accessible to the computing device(s) 504 (e.g., stored in a different component of vehicle 502 and/or be accessible to the vehicle 502 (e.g., stored remotely)).

In at least one example, the localization component 522 can include functionality to receive data from the sensor system(s) 506 to determine a position of the vehicle 502. In instances described herein, in which the sensor system(s) include(s) a time-of-flight sensor, the localization component 522 can receive data, e.g., raw data, such as quadrature data, processed data, such as intensity and/or depth information, or the like. In other implementations, the localization component 522 can include and/or request/receive a three-dimensional map, e.g., of the map(s) 530 of an environment and can continuously determine a location of the autonomous vehicle within the map. In some instances, the localization component 522 can use SLAM (simultaneous localization and mapping) or CLAMS (calibration, localization and mapping, simultaneously) to receive image data, such as from the time-of-flight sensor, LIDAR data, RADAR data, SONAR data, IMU data, GPS data, wheel encoder data, or any combination thereof, and the like to accurately determine a location of the autonomous vehicle 502. In some instances, the localization component 522 can provide data to various components of the vehicle 502 to determine an initial position of an autonomous vehicle for generating a candidate trajectory, as discussed herein.

In some examples, the perception component 524 can include functionality to perform object detection, segmentation, and/or classification. In some examples, the perception component 524 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 524 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning component 526 can determine a path for the vehicle 502 to follow to traverse through an environment. For example, the planning component 526 can determine various routes and trajectories and various levels of detail. For example, the planning component 526 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 526 can generate an instruction for guiding the autonomous vehicle along at least a portion of the route from the first location to the second location. In at least one example, the planning component 526 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning component 526 can alternatively, or additionally, use data from the perception component 524 to determine a path for the vehicle 502 to follow to traverse through an environment. For example, the planning component 526 can receive data from the perception component 524 regarding objects associated with an environment. Using this data, the planning component 526 can determine a route to travel from a first location (e.g., a current location) to a second location (e.g., a target location) to avoid objects in an environment.

In at least one example, the computing device(s) 504 can include one or more system controllers 528, which can be configured to control steering, propulsion, braking, safety, emitters, communication, and other systems of the vehicle 502. These system controller(s) 528 can communicate with and/or control corresponding systems of the drive module(s) 516 and/or other components of the vehicle 502, which may be configured to operate in accordance with a trajectory provided from the planning system 526.

In some examples, the one or more maps 530 can be stored on a remote computing device. In some examples, multiple maps 530 can be stored based on, for example, a characteristic (e.g., type of entity, time of day, day of week, season of the year, etc.). Storing multiple maps 530 can have similar memory requirements, but increase the speed at which data in a map can be accessed.

In at least one example, the sensor system(s) 506 can be similar to the sensor system(s) 104 described above with reference to FIG. 1. The sensor system(s) 106 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the computing device(s) 504.

The sensor system(s) 506 can include the sensor computing device(s) 508, which can include one or more processors 532 and memory 534 communicatively coupled with the one or more processors 532. The one or more processors 532 can be similar to the processor(s) 106 and/or the processor(s) 518 and/or the memory 530 can be similar to the memory 108 and/or the memory 520, described above. In the illustrated example, the memory 530 of the sensor system(s) 506 can store a depth determination component 536, a disambiguation component 538, a pixel filtering component 540, and a data transmission component 542. Though depicted as residing in the memory 530 for illustrative purposes, it is contemplated that the depth determination component 536, the disambiguation component 538, a pixel filtering component 540, and/or a data transmission component 542 can additionally, or alternatively, be accessible to the sensor system(s) 506 (e.g., stored in a different component of vehicle 502 and/or be accessible to the vehicle 502 (e.g., stored remotely)). Moreover, although the depth determination component 536, the disambiguation component 538, a pixel filtering component 540, and a data transmission component 542 are illustrated as being stored in and/or part of the sensor computing device(s) 508, in other implementations any or all of these components may be stored in the memory 520. That is, although FIG. 5 illustrates several components as being part of the sensor system(s) 506, the processing associated with any or all of those components may be performed other than at the sensor. In one example, the sensor system 506 may output raw data, e.g., the quadrature data discussed above, for processing in accordance with functionality ascribed herein to one or more of the depth determination component 536, the disambiguation component 538, a pixel filtering component 540, and a data transmission component 542, but that processing may be performed other than at the location of the emitter and the receiver.

The sensor computing device(s) 508, including the depth determination component 536, the disambiguation component 538, a pixel filtering component 540, and a data transmission component 542 may be configured to generate and/or process data in many formats. For example, and as noted above, the sensor computing device(s) 508 can measure a phase shift between the carrier and the response carrier and/or perform numerical integration calculations to determine the sensor data in the quadrature format. In other examples, the sensor computing device(s) 508 can determine an intensity and depth format of the sensor data. For purposes of illustration only, the sensor system(s) 506 can determine the sensor data in the intensity and depth format where an individual pixel in the sensor data is associated with an 8-bit value for the intensity and a 12-bit value for the depth.

In some implementations, the sensor computing device(s) 508 can also determine the sensor data in an unprojected format. For example, an unprojection can refer to a transformation from a two-dimensional frame (or a 5.5-dimensional frame) of reference into a three-dimensional frame of reference or a three-dimensional surface, while a projection can refer to a transformation from a three-dimensional frame of reference into a two-dimensional frame of reference. In some instances, techniques described herein can determine a location of the sensor system(s) 506 relative to the three-dimensional surface and unproject the data into the three-dimensional frame based at least in part on the depth information, pixel coordinate, intrinsic and extrinsic information associated with the sensor system(s) 506 (e.g., focal length, center, lens parameters, height, direction, tilt, etc.), and the known location of the sensor system(s) 506. In some instances, the depth information can be unprojected into the three-dimensional frame, and the distances between the sensor system(s) 506 and the various object contact points unprojected into the three-dimensional frame can be determined. In some instances, the unprojected three-dimensional points can correspond to a detailed map representing an environment that has been generated or built up over time using measurements from the sensor system(s) 506 or other mapping software and/or hardware. Because locations of the object contact points are known with respect to a three-dimensional surface, as the object moves over time (and accordingly, as various frames of object contact points are captured over time), various observations about the object such as orientation, length, width, velocity, etc. also can be determined over time.

As used herein, the term "unproject," "unprojected," or "unprojecting" can refer to a conversion of two-dimensional data into three-dimensional data, while in some cases, the term "project," "projected," or "projecting" can refer to a conversion of three-dimensional data into two-dimensional data. In some instances, determining the various formats of sensor data (e.g., the quadrature format, the intensity and depth format, and the unprojected format) can require different amounts of computational resources to determine and/or require different amounts of bandwidth to transmit.

The depth determination component 536 can be configured to receive depth information over multiple frames and determine depths of surfaces based on that information. For example, the depth determination component 536 can implement the functionality of the process 200 described above with reference to FIG. 2. For instance, and without limitation, the depth determination component 536 can determine an estimated depth of a surface based on first sensor data generated in a first sensor configuration having a relatively low modulation frequency. The depth determination component 536 can also determine candidate depths for a surface based on second sensor data generated in a second sensor configuration having a relatively high modulation frequency. The depth determination component can also identify one of the candidate depths as the measured depth for the surface, e.g., based on the estimated depth. In some examples, the first modulation frequency and the second modulation frequency may be determined based on a nominal maximum depth, or non-ambiguous range, associated with each. For example, the nominal maximum depth may be inversely proportional to the modulation frequency. The modulation frequency may also determine the wavelength of the carrier signal. In some examples, the first modulation frequency may be relatively low and have a relatively high first nominal maximum depth, and the second modulation frequency may be relatively high and have a relatively low second nominal maximum depth. As described herein, sensor data captured for a modulation frequency resulting in a relatively larger nominal maximum depth will have more error than sensor data captured for a modulation frequency resulting in a relatively shorter nominal maximum depth. The first nominal maximum depth may be two or more times that of the second nominal maximum depth, and, in some instances, the first nominal maximum depth and the second nominal maximum depth may be coprime. Moreover, the first modulation frequency may be selected such that the first nominal maximum depth is larger than a distance at which the sensor is likely to sense most objects.

The disambiguation component 538 can be configured to receive depth information over multiple frames and determine a depth of objects according to those frames. For example, as detailed herein, the disambiguation component 538 can determine whether a return is beyond a nominal maximum depth of a sensor in a first sensor configuration having a relatively large nominal maximum depth. In some examples, the disambiguation component 538 may implement the process 300 discussed above with reference to FIG. 3. In some instances, the disambiguation component 538 can determine first candidate depths (e.g., distances) based on the depth data captured at a first modulation frequency and second candidate depths (e.g., distances) based on depth data captured at a second modulation frequency. The disambiguation component 538 may determine the depth corresponding to one of the first candidate depths and to one of the second candidate depths as an actual depth for each pixel. In some instances, the first nominal maximum depth and the second nominal maximum depth may be coprime. In implementations described herein, the disambiguation component 538 can further disambiguate the depth using error measurements for the two (or more) modulation frequencies, e.g., by weighting more heavily the return from the modulation frequency with the lower non-ambiguous range. The disambiguation component can also determine whether measured surfaces are beyond the relatively larger nominal maximum depth associated with the sensor, e.g., by comparing an intensity of a surface to a threshold intensity.

The pixel filtering system 542 can be configured to receive sensor data generated by the sensor system(s) 506, e.g., by a time-of-flight senor, and filter the sensor data to remove certain pixels. For example, and without limitation, the pixel filtering system 542 can implement the process 400 detailed above with reference to FIG. 4. In examples described herein, filtering sensor data can include retaining pixels associated with sensed objects and rejecting pixels associated with background objects and/or objects beyond a nominal maximum depth associated with the sensor. For example, and as detailed herein, data generated by time-offlight sensors can include noise, especially from stray light caused by a number of factors. Removing noisy pixels can provide down-stream systems with improved data. In examples described herein, pixel noise can be particularly problematic in implementations in which a distance to objects in the environment is required, e.g., to safely travel through an environment relative to such objects.

The data transmission component 542 can transmit the sensor data from the sensor computing device(s) 508, e.g., to the localization component 522, the perception component 524, and/or the planning component 526.

The vehicle 502 can also include one the emitter(s) 510 for emitting light and/or sound, as described above. The emitter(s) 510 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 510 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include the communication connection(s) 512 that enable communication between the vehicle 502 and one or more other local or remote computing device(s). For instance, the communication connection(s) 512 can facilitate communication with other local computing device(s) on the vehicle 502 and/or the drive module(s) 516. Also, the communication connection(s) 512 can allow the vehicle to communicate with other nearby computing device(s) (e.g., other nearby vehicles, traffic signals, etc.). The communications connection(s) 512 can also enable the vehicle 502 to communicate with a remote teleoperations computing device or other remote services.

The communications connection(s) 512 can include physical and/or logical interfaces for connecting the computing device(s) 504 to another computing device or an external network (e.g., the Internet). For example, the communications connection(s) 512 can enable Wi-Fi-based communication such as via frequencies defined by the IEEE 802.11 standards, short range wireless frequencies such as Bluetooth, cellular communication (e.g., 5G, 3G, 4G, 4G LTE, 5G, etc.) or any suitable wired or wireless communications protocol that enables the respective computing device to interface with the other computing device(s).

In at least one example, the vehicle 502 can include one or more drive modules 516. In some examples, the vehicle 502 can have a single drive module 516. In at least one example, if the vehicle 502 has multiple drive modules 516, individual drive modules 516 can be positioned on opposite ends of the vehicle 502 (e.g., the front and the rear, etc.). In at least one example, the drive module(s) 516 can include one or more sensor systems to detect conditions of the drive module(s) 516 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 516. In some cases, the sensor system(s) on the drive module(s) 516 can overlap or supplement corresponding systems of the vehicle 502 (e.g., sensor system(s) 506).

The drive module(s) 516 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 516 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 516. Furthermore, the drive module(s) 516 also include one or more communication connection(s) that enable communication by the respective drive module with one or more other local or remote computing device(s).

The processor(s) 518 of the vehicle 502, the processor(s) 532 of the sensor computing device(s), and/or the processor(s) 106 of the sensor system(s) 104 can be any suitable processor capable of executing instructions to process data and perform operations as described herein. By way of example and not limitation, the processor(s) 518, 532, 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 520, 534, 108 are examples of non-transitory computer-readable media. The memory 520, 534, 108 can store an operating system and one or more software applications, instructions, programs, and/or data to implement the methods described herein and the functions attributed to the various systems. In various implementations, the memory 520, 534, 108 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 520, 534, 108 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

FIGS. 6-9 illustrate example processes in accordance with embodiments of the disclosure. These processes, as well as the processes of FIGS. 2-4 are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 6:
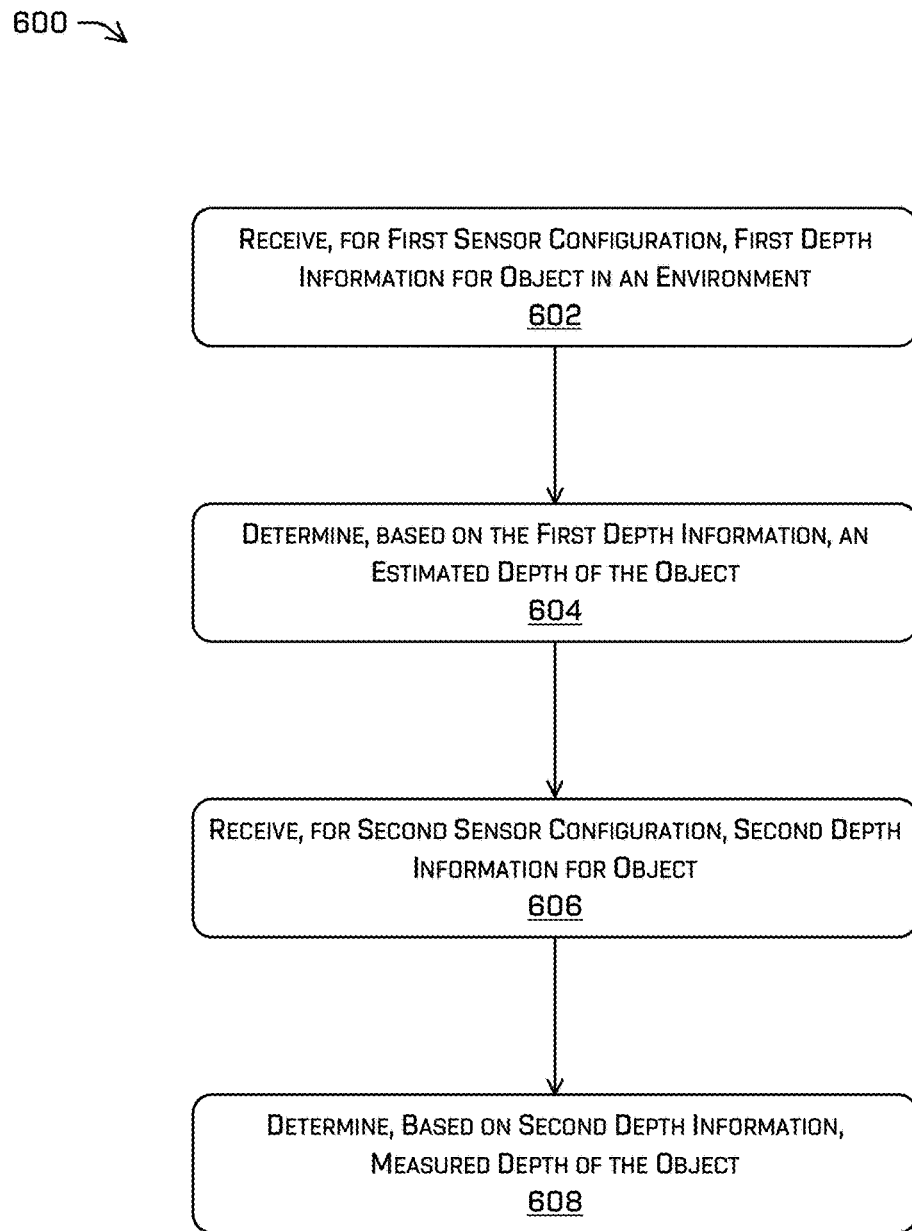
FIG. 6 is a flowchart illustrating an example method for determining a depth of a surface using multiple time-of-flight returns associated with different configurations of the time-of-flight sensor, as described herein.

FIG. 6 depicts an example process 600 for determining depths of surfaces (or objects) in an environment using a sensor system. For example, some or all of the process 600 can be performed by the sensor system 104 and/or by one or more components illustrated in FIG. 5, as described herein. For example, some or all of the process 300 can be performed by the sensor system(s) 506, including, but not limited to, the depth determination component 536.

At an operation 602, the process 600 includes receiving, for a first sensor configuration, first depth information for an object in an environment. For example, techniques described herein may be useful for improving depth determinations based on sensor data received from a time-of-flight sensor. In these examples, the time-of-flight sensor generates raw data in the form of quadrature data, which may be used to determine depth and/or intensity values for pixels of a receiver of the time-of-flight sensor. So, for example, the operation 302 may include receiving the quadrature data, e.g., as a group of four frames, each corresponding to one of four different phases of reading return signals, and processing those four frames to generate a single frame. The single frame can include intensity and depth data for each pixel in the frame.

As noted, the first depth information is associated with a first sensor configuration. For example, the configuration may include a first integration time, a first illumination power, and/or a first modulation frequency. As described herein, the modulation frequency may be inversely proportional to a nominal maximum depth associated with the first sensor configuration. In examples, the first sensor configuration includes a relatively low modulation frequency, e.g., 5 MHz or less, to provide a relatively large nominal maximum depth in the first senor configuration.

At an operation 604, the process 600 can include determining, based on the first depth information, an estimated depth of the object. As noted above, the first sensor configuration is selected to provide a relatively large nominal maximum sensor depth. In examples, the nominal maximum sensor depth is selected such that most objects detectable by the sensor are within the nominal maximum sensor depth. For example, the nominal maximum sensor depth may be 25 meters or more. Because of this relatively large nominal maximum depth, the process 600 can estimate the depth of a measured object as the nominal measurement. For instance, if the first depth information indicates that an object is at 16 meters and the nominal maximum depth associated with the first sensor configuration is 30 meters, the operation 604 may estimate the depth of the object as 16 meters, as opposed to the sum of 16 meters and some multiple of the nominal maximum depth, e.g., 46 meters, 76 meters, or the like, as described herein.

At an operation 606, the process 600 can include receiving, for a second sensor configuration, second depth information for the object. The operation 606 may be substantially the same as the operation 602, but the data may be captured at a second sensor configuration different from the first sensor configuration. In some examples, the second configuration may include at least a different modulation frequency. For instance, the modulation frequency associated with the second sensor configuration may be significantly higher than the modulation frequency associated with the first sensor configuration. In some examples, the first image data may represent a first image frame and the second image data may represent second image frame. In some examples, the first image frame and the second image frame may be successive image frames in a stream of image frames captured by the sensor.

At operation 608, the process 600 can include determining, based on the second depth information, a measured depth of the object. For example, the operation 608 can include determining candidate depths for the object based on the second depth information. For example, because the second sensor configuration has a relatively smaller nominal maximum depth, the sensed depth of the surface in the second configuration is more likely to be ambiguous. Considering the example of above in which the estimated depth is 16 meters, the second depth information may indicate a sensed depth of 0.2 meters. In this example, if the nominal maximum depth associated with the second sensor configuration is 4 meters, the actual depth of the surface could be 0.2 meters (the sensed depth) or could be the sum of the sensed depth and a multiple of the nominal maximum depth, or 4 meters. Accordingly, the depth of the surface may be 0.2 meters, 4.2 meters, 8.2 meters, 12.2 meters, 16.2 meters, 20.2 meters, and so forth. In this example, 16.2 is the candidate depth based on the second depth information closest to the estimated depth. Thus, the operation 608 determines the measured depth of the object to be 16.2 meters. According to examples described herein, the first depth information is used to determine an estimate, but the second depth information is used as the actual measured value of the surface. Thus, the process 600 may not require depth disambiguation techniques, which can require additional processing power and/or result in errors or the like.

Although examples used to discuss FIG. 6 can include using one first frame, captured at a first sensor system configuration, and one second frame, captured at a second sensor system configuration, to determine information about objects in the environment, other implementations may consider more frames. For example, the first frame and the second frame may be used to determine the blended intensity, but one or more different frames may be used to determine the estimated, candidate, and measured depth values. For instance, two of the frames may be captured at the same modulation frequency. For example, the multiple returns at the same modulation frequency may be used to verify each other. This may be particularly beneficial in the case of a rapidly-changing environment, e.g., because the vehicle is moving relatively quickly and/or because many different objects are in the environment. Similarly, more than two frames may provide even more robust intensity information than the two frames provide in the foregoing example(s).

Figure 7:
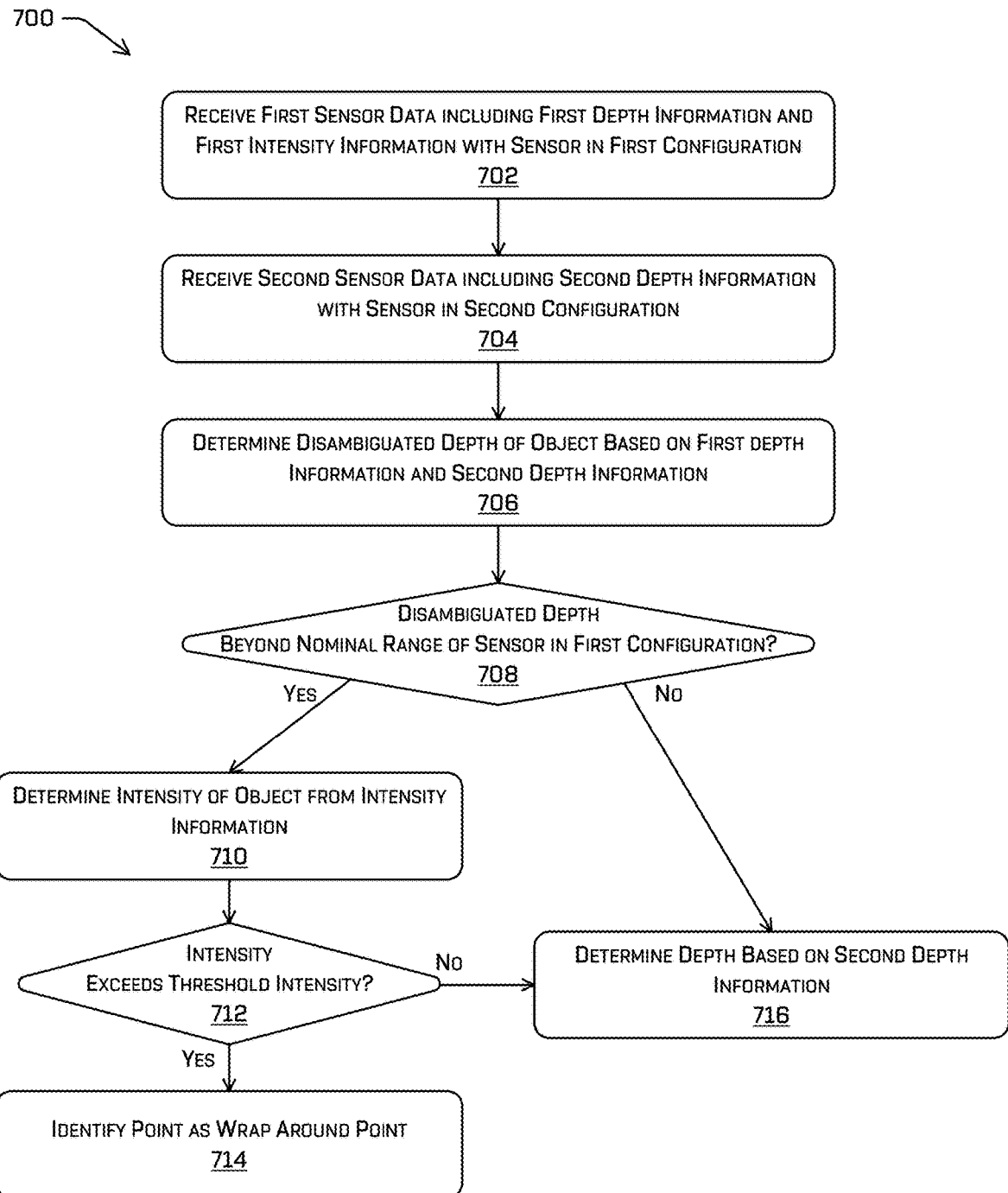
FIG. 7 is a flowchart illustrating an example method for determining whether time-of-flight sensor returns are beyond a nominal maximum sensor depth of the time-of-flight sensor, as described herein.

FIG. 7 depicts an example process 700 of determining whether a sensed surface is beyond a nominal range, e.g., a nominal maximum depth, of the sensor. In some examples, the process 700 may be a part of the process 300, although the process 300 does not require the process 700 and the process 700 may have additional uses.

At an operation 702, the process 700 includes receiving first sensor data including first depth information and first intensity information with a sensor in a first configuration. For example, the first sensor data may be quadrature data generated by the sensor in response to receiving a reflected carrier signal. In other examples, the first sensor data may be a depth image and/or an intensity image, e.g., generated from quadrature data as described herein. In some examples, the first sensor configuration can include a relatively small modulation frequency, e.g., on the order of about 10 MHz or smaller or 5 MHz or smaller.

At an operation 704, the process 700 includes receiving second sensor data including second depth information and second intensity information with the sensor in a second configuration. For example, the second sensor data may be quadrature data generated by the sensor in response to receiving a reflected carrier signal in the second configuration. In other examples, the second sensor data may be a depth image and/or an intensity image, e.g., generated from quadrature data as described herein. In some examples, the second sensor configuration can include a relatively high modulation frequency, e.g., on the order of about 15 MHz or higher or 20 MHz or higher.

At an operation 706, the process 700 includes determining a disambiguated depth of the object based on the first depth information and the second depth information. For example, the disambiguated depth may be determined by determining a plurality of first candidate depths, based on the first depth information, and a plurality of second candidate depth, based on the second depth information. The disambiguated depth may be based on the first candidate depth and the second candidate depth that are closest to each other. For example, the operation 706 may be similar to or the same as the operation 314 in FIG. 3.

At an operation 708, the process 700 includes determining whether the disambiguated depth is beyond a nominal range of the sensor in the first configuration. For example, the operation 708 may include comparing the disambiguated depth to the relatively large nominal maximum depth associated with the first sensor configuration.

If, at the operation 708 it is determined that the disambiguated depth is beyond the nominal range, the process 700 includes, as an operation 710, determining an intensity of the object from the intensity information. As described herein, the first sensor data and/or the second sensor data can include both depth and intensity information. The operation 710 can include determining, from the sensor data, an intensity of the surface determined to be beyond the nominal range of the sensor. For example, the operation 710 can include determining the intensity from a depth image associated with one or both of the first sensor data and the second sensor data.

At an operation 712, the process 700 includes determining whether the intensity exceeds a threshold intensity. For example, the operation 712 can include comparing the intensity determined at the operation 710 with a threshold intensity. As described herein, the first sensor configuration (or one of the sensor configurations) is associated with a relatively low modulation frequency, resulting in a relatively high nominal range for the sensor. Accordingly, most detectable objects beyond the nominal range of the sensor in the first configuration are not detectable by the sensor. However, highly reflective objects, e.g., retroreflectors, may reflect sufficient emitted light to be sensed by the sensor. So, although highly reflective surfaces may be detectable beyond the nominal range of the sensor, such surfaces may be expected to have higher intensities. Thus, the threshold intensity may be selected based on properties of highly reflective objects at significant distances.

If, at the operation 712, it is determined that the intensity does exceed the threshold intensity, at an operation 714, the process 700 includes identifying the point (or the surface) as being a wrap-around point. That is, the measured surface is confirmed to be beyond the nominal range of the sensor. In examples, the wrap-around point may be filtered out, or the depth (confirmed to be beyond the nominal range) and/or the intensity may be used for other purposes, e.g., to model a surface or object at the distance beyond the nominal range.

If, at the operation 708, it is determined that the disambiguated depth is not beyond the nominal range of the sensor in the first configuration, and/or if, at the operation 714, it is determined that the intensity does not exceed the threshold intensity, the process 700 can include, as an operation 718, determining a depth based on the second depth information. For example, if the disambiguated depth is not beyond the nominal range of the sensor, and/or the intensity does not suggest a highly reflective surface, the return may be determined to have a depth corresponding to the disambiguated depth, a depth determined from the first depth information, a depth determined from the second depth information, and/or from a combination of the depths. In still further examples, the operation 718 can include disregarding the surface, e.g., by filtering out pixels associated with the surface.

Figure 8:
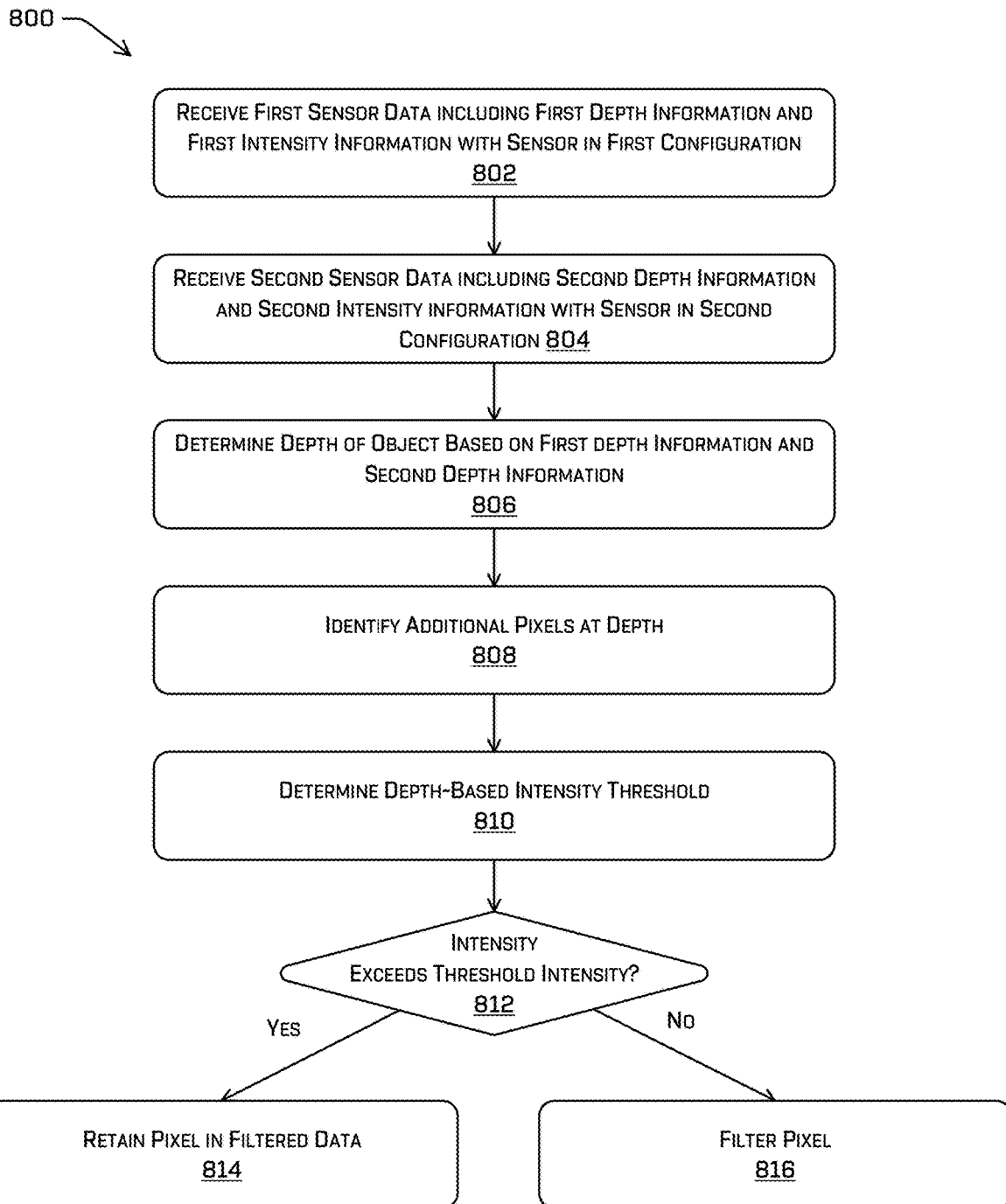
FIG. 8 is a flowchart illustrating an example method of filtering time-of-flight sensor information, as described herein.

FIG. 8 depicts an example process 800 of filtering sensor data based at least in part on depth and intensity information. In some examples, the process 800 may be a part of the process 400, although the process 400 does not require the process 400 and the process 800 may have additional uses.

At an operation 802, the process 800 includes receiving first sensor data including first depth information and first intensity information with a sensor in a first configuration. For example, the first sensor data may be quadrature data generated by the sensor in response to receiving a reflected carrier signal. In other examples, the first sensor data may be a depth image and/or an intensity image, e.g., generated from quadrature data as described herein. In some examples, the first sensor configuration can include a relatively small modulation frequency, e.g., on the order of about 10 MHz or smaller or 5 MHz or smaller.

At an operation 804, the process 800 includes receiving second sensor data including second depth information and second intensity information with the sensor in a second configuration. For example, the second sensor data may be quadrature data generated by the sensor in response to receiving a reflected carrier signal in the second configuration. In other examples, the second sensor data may be a depth image and/or an intensity image, e.g., generated from quadrature data as described herein. In some examples, the second sensor configuration can include a relatively high modulation frequency, e.g., on the order of about 15 MHz or higher or 20 MHz or higher.

At an operation 806, the process 800 includes determining a measured depth of the object based on the first depth information and the second depth information. In some examples, the depth may be determined using the process 200 and/or as the disambiguated depth determined using the operation 314 in the process 300.

At an operation 808, the process 800 also includes identifying additional pixels at the depth. For example, the process 400 described above illustrates determining subsets of pixels having the same or similar depths. In some instances, the subsets can include neighboring pixels that have the same depth or a depth within a predetermined range. In some instances, one or more subsets may be associated with pixels beyond a nominal maximum depth of the sensor and one or more subsets may be associated with pixels within the nominal maximum depth.

At an operation 810, the process 800 includes determining depth-based intensity thresholds. For example, the operation 810 can include determining intensity thresholds for different of the subsets of the pixels. For instance, and as detailed further above with reference to FIG. 4, the threshold intensity may be higher for greater depths (or depth ranges) and lower for shorter depths (or depth ranges). In some instances, a first threshold intensity may be applied to all pixels beyond the nominal maximum depth of the sensor in the first configuration (as described herein) and a second, lower threshold intensity may be applied to all pixels within the nominal maximum depth.

At an operation 812, the process 800 includes determining whether an intensity of a pixel exceeds the threshold intensity. For example, the operation 812 can include determining, from the first intensity information or the second intensity information, which may be a first intensity image and a second intensity image, whether pixels in a subset of pixels (determined at the operation 808) meet or exceed the associated intensity determined at the operation 810.

If, at the operation 814 it is determined that the intensity of the pixel does exceed the threshold intensity, at an operation 814, the process 800 includes retaining the pixel in filtered data. Alternatively, if, at the operation 814 it is determined that the intensity of the pixel does not exceed the threshold intensity, at an operation 816 the process 800 includes filtering the pixel, e.g., by removing the pixel from data subsequently used.

According to the process 800, the amount of data transmitted from the sensor may be reduced, thereby improving processing requirements for systems and components using the sensor data. For example, the process 800 may retain only sensor data that is relevant for controlling an autonomous vehicle. Moreover, by filtering pixels based on varying intensity thresholds determined based on pixel depth, the accuracy of filtering may be improved.

Figure 9:
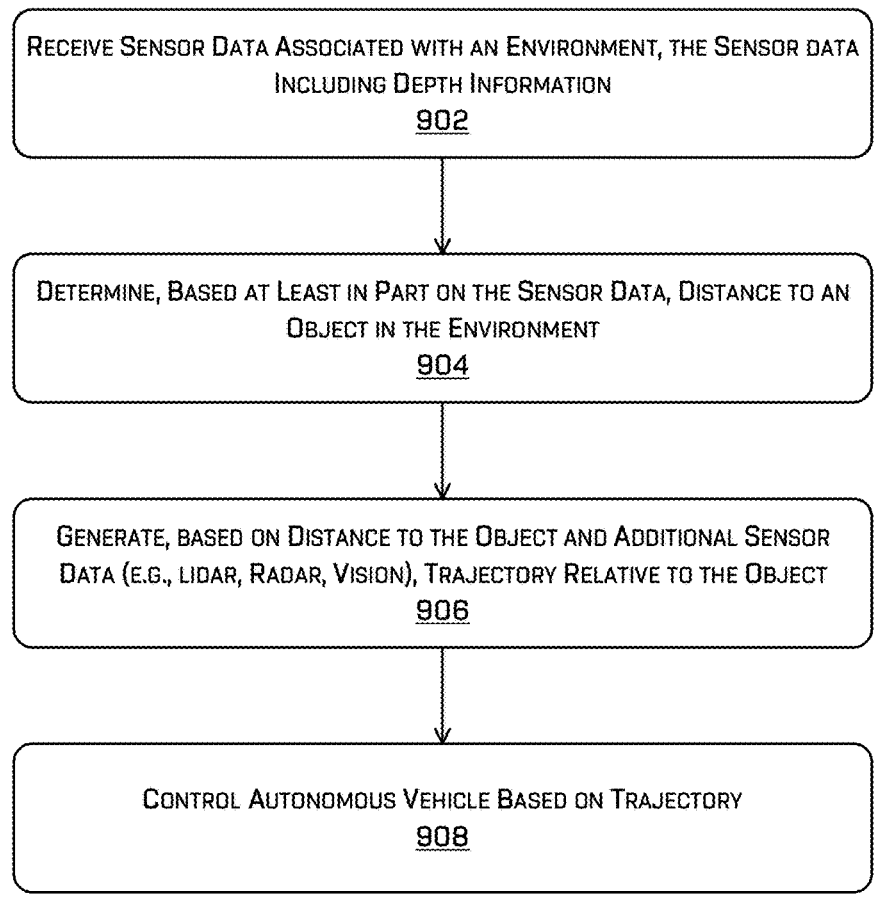
FIG. 9 is a flowchart illustrating an example method for controlling a vehicle relative to obstacles sensed at least in part by a time-of-flight sensor, as described herein.

FIG. 9 depicts an example process 900 for controlling an autonomous vehicle relative to objects in an environment, as discussed herein. For example, some or all of the process 900 can be performed by the vehicle 102 of FIG. 1 and/or the vehicle 502 and its related components illustrated in and discussed with reference to, FIG. 5. For example, some or all of the process 900 can be performed by the localization component 522, the perception component 524, the planning component 526, and/or the one or more system controllers 528.

At operation 902, the process can include receiving sensor data, including depth and/or intensity information. For example, the sensor data may be received from a time-of-flight sensor. The sensor data may be raw data, e.g., quadrature data, from which the depth and/or intensity information can be determined in accordance with techniques described herein, or the sensor data may include the intensity and/or depth values. The sensor data may also be received from the time-of-flight sensor on a frame-by-frame basis or the sensor data may be a resolved frame (or data associated therewith).

At operation 904, the process 900 can include determining, based at least in part on the sensor data, a distance to an object in the environment. For example, the process 200 and/or the process 300 may be used to determine a depth of an object. Moreover, the localization component 522 and/or the perception component 524 may receive the depth and/or intensity data at 902 and identify objects in the environment at the depth. For example, the vehicle computing device(s) 504 may classify objects based on the sensor data and map the objects in the environment relative to the vehicle 502.

At operation 906, the process 900 can include generating, based on the distance to the object and additional sensor data (e.g., LiDAR data, radar data, vision data), a trajectory relative to the object(s). For example, the planning component 526 of the vehicle computing device(s) 504 can further determine relative movement, e.g., velocity and acceleration, of the objects in the environment using one or more sensor modalities, object classification data, and the maps 530 and/or other information to determine the travel path. In some examples, the travel path may be based at least in part on fused data including data from one or more sensor modalities, including a time-of-flight sensor, LiDAR, radar, or the like.

At operation 908, the process 900 can include controlling an autonomous vehicle to follow the travel path. In some instances, the commands generated in the operation 908 can be relayed to a controller onboard an autonomous vehicle to control the autonomous vehicle to drive the travel path. Although discussed in the context of an autonomous vehicle, the process 900, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example vehicle includes: a time-of-flight sensor; one or more processors; and memory storing processor-executable instructions that, when executed by the one or more processors, configure the vehicle to: receive first depth information generated by the time-of-flight sensor, the first depth information being based, at least in part, on a first modulation frequency; determine, based on the first depth information, an estimated depth of an object from the time-of-flight sensor, the estimated depth being less than a nominal maximum sensor depth associated with the first modulation frequency; receive second depth information generated by the time-of-flight sensor, the second depth information being based, at least in part, on a second modulation frequency higher than the first modulation frequency; determine a plurality of candidate depth measurements based, at least in part, on the second depth information; and determine a measured distance of the object from the time-of-flight sensor as a one of the plurality of candidate depth measurements closest to the estimated depth.

B: The vehicle of example A, wherein: the second modulation frequency is selected to provide a second nominal maximum sensor depth less than the nominal maximum sensor depth associated with the first modulation frequency.

C: The vehicle of example A or example B, wherein the first modulation frequency is equal to or less than about 10 MHz and the second modulation frequency is equal to or greater than about 15 MHz.

D: The vehicle of any one of example A through example C, wherein the plurality of candidate depth measurements comprises a first depth measurement and a second depth measurement, the second depth measurement comprising a sum of the first depth measurement and a nominal maximum sensor depth associated with the second modulation frequency.

E: The vehicle of any one of example A through example D, wherein the instructions further configure the vehicle to: determine, based at least in part on at least one of the measured distance of the object, a position of the object in an environment of the vehicle; determine a travel path through the environment relative to the object; and control the vehicle to travel along the travel path.

F: An example method includes: receiving, from a time-of-flight sensor configured in a first configuration, first depth information about a surface, the first configuration comprising a first modulation frequency; determining, based on the first depth information, an estimated depth of the surface from the time-of-flight sensor, the estimated depth being less than a nominal maximum depth of the time-of-flight sensor in the first configuration; receiving, from the time-of-flight sensor configured in a second configuration, second data comprising second depth information about the surface, the second configuration comprising a second modulation frequency higher than the first modulation frequency; and determining, based at least in part on the second depth information and the estimated distance, a measured depth of the surface.

G: The method of example F, wherein the estimated depth is a sensed depth of the surface determined from the first depth information.

H: The method of example F or example G, wherein the first modulation frequency is selected to provide the nominal maximum depth of the time-of-flight sensor in the first configuration and the second modulation is selected to provide a second nominal maximum depth of the time-of-flight sensor in the second configuration, the second nominal maximum depth being less than the nominal maximum depth.

I: The method of any one of example F through example H, wherein the determining the actual depth comprises: determining, based on the second depth information, a plurality of candidate depths; comparing the plurality of candidate depths to the estimated depth; and determining the measured depth as the one of the plurality of candidate depths closest to the estimated depth.

J: The method of any one of example F through example I, wherein the plurality of candidate depths comprise a measured depth of the surface determined from the second depth information and a second depth comprising a sum of the measured depth and the second nominal maximum depth of the time-of-flight sensor in the second configuration.

K: The method of any one of example F through example J, wherein the measured depth and the second depth are shorter than the nominal maximum depth associated with the time-of-flight sensor in the first configuration.

L: The method of any one of example F through example K, wherein the first modulation frequency is equal to or less than about 10 MHz and the second modulation frequency is equal to or greater than about 15 MHz.

M: The method of any one of example F through example L, wherein the first modulation frequency is from about 3

MHz to about 5 MHz and the second modulation frequency is from about 21 MHz to about 24 MHz.

N: The method of any one of example F through example M, further comprising: determining, based at least in part on the actual depth of the surface, a position of an object in an environment of a vehicle; determining a trajectory of the vehicle through the environment relative to the object; and controlling the vehicle to travel along the trajectory.

O: An example system includes: one or more processors; and computer-readable storage media storing instructions executable by the one or more processors to perform acts comprising: receiving first time-of-flight sensor information determined in a first configuration, the first time-of-flight sensor information including first depth information and the first configuration having a first modulation frequency; determining an estimated distance of a surface based on the first depth information, the estimated distance being less than a nominal maximum depth associated with the first configuration; receiving second time-of-flight sensor information determined in a second configuration, the second time-of-flight sensor information including second depth information and the second configuration having a second modulation frequency greater than the first modulation frequency; and determining, based at least in part on the second depth information and the estimated distance, a measured depth of the surface.

P: The system of example O, wherein the estimated depth is a sensed depth of the surface determined from the first depth information.

Q: The system of example O or example P, wherein the determining the measured depth comprises: determining, based on the second depth information, a plurality of candidate depths for the surface; comparing the plurality of candidate depths to the estimated depth; and determining the measured depth of the surface as the one of the plurality of candidate depths closest to the estimated depth.

R: The system of any one of example O through example Q, wherein the plurality of candidate depths comprise a measured depth of the surface determined from the second depth information and a second depth comprising a sum of the measured depth and a nominal maximum depth associated with the second configuration.

S: The system of any one of example O through example R, wherein the measured depth and the second depth are shorter than the nominal maximum depth associated with the time-of-flight sensor in the first configuration.

T: The system of any one of example O through example S, wherein the first modulation frequency is equal to or less than about 10 MHz and the second modulation frequency is equal to or greater than about 15 MHz.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:
a time-of-flight sensor;
one or more processors; and
memory storing processor-executable instructions that, when executed by the one or more processors, configure the vehicle to:
configure the time-of-flight sensor in a first configuration;
receive, with the time-of-flight sensor in the first configuration, first depth information generated by the time-of-flight sensor, the first depth information being based, at least in part, on a first modulation frequency;
determine, based on the first depth information, an estimated depth of an object from the time-of-flight sensor, the estimated depth not exceeding a first nominal maximum sensor depth associated with the first modulation frequency;
configure the time-of-flight sensor in a second configuration;
receive, with the time-of-flight sensor in the second configuration, second depth information generated by the time-of-flight sensor, the second depth information being based, at least in part, on a second modulation frequency higher than the first modulation frequency;
determine a plurality of candidate depth measurements based, at least in part, on the second depth information, a first candidate depth of the candidate depth measurements comprising a nominal depth not exceeding a second nominal maximum sensor depth associated with the second modulation frequency and a second candidate depth of the candidate depth measurements comprising a sum of the nominal depth and a multiple of the second nominal maximum sensor depth; and
determine a measured distance of the object from the time-of-flight sensor as one of the plurality of candidate depth measurements closest to the estimated depth.

2. The vehicle of claim 1, wherein:
the second modulation frequency is selected to provide the second nominal maximum sensor depth less than the first nominal maximum sensor depth associated with the first modulation frequency.

3. The vehicle of claim 2, wherein the first modulation frequency is equal to or less than 10 MHz and the second modulation frequency is equal to or greater than 15 MHz.

4. The vehicle of claim 1, wherein the plurality of candidate depth measurements comprises a first depth measurement and a second depth measurement, the second depth measurement comprising a sum of the first depth measurement and the second nominal maximum sensor depth associated with the second modulation frequency.

5. The vehicle of claim 1, wherein the instructions further configure the vehicle to:
   determine, based at least in part on at least one of the measured distance of the object, a position of the object in an environment of the vehicle;
   determine a travel path through the environment relative to the object; and
   control the vehicle to travel along the travel path.

6. A method comprising:
   configuring a time-of-flight sensor in a first configuration, the first configuration having an associated first modulation frequency;
   emitting, with the time-of-flight sensor in the first configuration, first emitted light at the first modulation frequency;
   receiving, at the time-of-flight sensor, first return light associated with the first emitted light;
   determining, based at least in part on the first return light, first depth information about a surface;
   determining, based on the first depth information, an estimated depth of the surface from the time-of-flight sensor, the estimated depth not exceeding a first nominal maximum depth of the time-of-flight sensor associated with the first configuration;
   configuring the time-of-flight sensor in a second configuration having an associated second modulation frequency higher than the first modulation frequency;
   emitting, with the time-of-flight sensor in the second configuration, second emitted light at the second modulation frequency;
   receiving, at the time-of-flight sensor, second return light associated with the second emitted light;
   determining, based at least in part on the second return light, second data comprising second depth information about the surface;
   determining, based at least in part on the second depth information, a plurality of candidate depths of the surface, the plurality of candidate depths comprising a nominal depth not exceeding a second nominal maximum depth of the time-of-flight sensor associated with the second configuration and a first candidate depth comprising a sum of the nominal depth and the second nominal maximum depth; and
   determining a measured depth of the surface as one of the plurality of candidate depths closest to the estimated depth.

7. The method of claim 6, wherein the estimated depth is a sensed depth of the surface determined from the first depth information.

8. The method of claim 6, wherein the first modulation frequency is selected to provide the first nominal maximum depth of the time-of-flight sensor in the first configuration and the second modulation is selected to provide the second nominal maximum depth of the time-of-flight sensor in the second configuration, the second nominal maximum depth being less than the nominal maximum depth.

9. The method of claim 8, wherein the determining the measured depth comprises:
   determining, based on the second depth information, the plurality of candidate depths;
   comparing the plurality of candidate depths to the estimated depth; and
   determining the measured depth as the one of the plurality of candidate depths closest to the estimated depth.

10. The method of claim 9, wherein the plurality of candidate depths comprise a measured depth of the surface determined from the second depth information and a second depth comprising a sum of the measured depth and the second nominal maximum depth of the time-of-flight sensor in the second configuration.

11. The method of claim 10, wherein the measured depth and the second depth are shorter than the first nominal maximum depth associated with the time-of-flight sensor in the first configuration.

12. The method of claim 6, wherein the first modulation frequency is equal to or less than 10 MHz and the second modulation frequency is equal to or greater than 15 MHz.

13. The method of claim 12, wherein the first modulation frequency is from 3 MHz to 5 MHz and the second modulation frequency is from 21 MHz to 24 MHz.

14. The method of claim 6, further comprising:
   determining, based at least in part on the actual depth of the surface, a position of an object in an environment of a vehicle;
   determining a trajectory of the vehicle through the environment relative to the object; and
   controlling the vehicle to travel along the trajectory.

15. A system comprising:
   one or more processors; and
   computer-readable storage media storing instructions executable by the one or more processors to perform acts comprising:
   causing a time-of-flight sensor to be configured in a first configuration, the first configuration having an associated first modulation frequency;
   causing the time-of-flight sensor to emit, with the time-of-flight sensor in the first configuration, first emitted light at the first modulation frequency;
   determining, based at least in part on first return light associated with the first emitted light and received at the time-of-flight sensor, first time-of-flight sensor information associated with the first configuration, the first time-of-flight sensor information including first depth information;
   determining an estimated distance of a surface based on the first depth information, the estimated distance not exceeding a first nominal maximum depth associated with the first configuration;
   causing the time-of-flight sensor to be configured in a second configuration, the second configuration having an associated second modulation frequency higher than the first modulation frequency;
   causing the time-of-flight sensor to emit, with the time-of-flight sensor in the second configuration, second emitted light at the second modulation frequency;
   determining, based at least in part on second return light associated with the first emitted light and received at the time-of-flight sensor, second time-of-flight sensor information determined in the second configuration, the second time-of-flight sensor information including second depth information and the second configuration having an associated second nominal maximum depth different from the first nominal maximum depth; and
   determining, based at least in part on the second depth information and the estimated distance, a measured depth of the surface, the measured depth corresponding to a candidate depth of a plurality of candidate depths, the plurality of candidate depths comprising a nominal depth not exceeding a second nominal maximum depth of the time-of-flight sensor associated with the second configuration and a first candidate depth comprising a sum of the nominal depth and the second nominal maximum depth.

16. The system of claim 15, wherein the estimated depth is a sensed depth of the surface determined from the first depth information.

17. The system of claim 15, wherein the determining the measured depth comprises:
- determining, based on the second depth information, the plurality of candidate depths for the surface;
- comparing the plurality of candidate depths to the estimated depth; and
- determining the measured depth of the surface as the one of the plurality of candidate depths closest to the estimated depth.

18. The system of claim 17, wherein the plurality of candidate depths comprise a measured depth of the surface determined from the second depth information and a second depth comprising a sum of the measured depth and the second nominal maximum depth associated with the second configuration.

19. The system of claim 18, wherein the measured depth and the second depth are shorter than the first nominal maximum depth associated with the time-of-flight sensor in the first configuration.

20. The system of claim 15, wherein the first modulation frequency is equal to or less than 10 MHz and the second modulation frequency is equal to or greater than 15 MHz.

* * * * *